United States Patent
Falk

(10) Patent No.: US 12,059,606 B2
(45) Date of Patent: Aug. 13, 2024

(54) METHOD AND DEVICE FOR MAKING A HOLE IN A GOLF GREEN

(71) Applicant: KSAB Golf Equipment AB, Vasteras (SE)

(72) Inventor: Carl Gustav Falk, Sollentuna (SE)

(73) Assignee: KSAB GOLF EQUIPMENT AKTIEBOLAG, Västerås (SE)

(*) Notice: Subject to any disclaimer, the term of this patent is extended or adjusted under 35 U.S.C. 154(b) by 0 days.

(21) Appl. No.: 18/042,227

(22) PCT Filed: Aug. 13, 2021

(86) PCT No.: PCT/SE2021/050792
§ 371 (c)(1),
(2) Date: Feb. 20, 2023

(87) PCT Pub. No.: WO2022/039646
PCT Pub. Date: Feb. 24, 2022

(65) Prior Publication Data
US 2023/0226419 A1 Jul. 20, 2023

(30) Foreign Application Priority Data
Aug. 21, 2020 (SE) .................................. 2050971-7

(51) Int. Cl.
*A63B 57/40* (2015.01)
*A01B 1/16* (2006.01)
(Continued)

(52) U.S. Cl.
CPC .............. *A63B 57/40* (2015.10); *A01B 1/165* (2013.01); *A01B 45/00* (2013.01); *B25D 9/04* (2013.01);
(Continued)

(58) Field of Classification Search
CPC ......... A63B 57/40; A01B 1/165; A01B 45/00; B25D 9/04; B25D 9/12; B25D 2250/241; E21B 7/027; E21B 11/005
See application file for complete search history.

(56) References Cited

U.S. PATENT DOCUMENTS 1,568,321 A * 1/1926 Coldwell ............. A63B 57/357
473/176
3,416,831 A * 12/1968 Bishop et al. ........... A01C 5/02
294/50.5
(Continued)

FOREIGN PATENT DOCUMENTS

GB 2031484 A 4/1980

OTHER PUBLICATIONS

Swedish Intellectual Property Office, Stockholm, Sweden, International Search Report and Written Opinion, Sep. 3, 2021.
European Patent Office, Munich, Germany, European Search Report, Jan. 31, 2024.

*Primary Examiner* — Thomas B Will
*Assistant Examiner* — Joel F. Mitchell
(74) *Attorney, Agent, or Firm* — Noréns Patentbyrå AB

(57) ABSTRACT

A golf green hole-making device has longitudinal, radial, and angular directions, and includes a cutting cylinder, a structure, a weight, a weight propulsion device, a soil expulsion piston, a piston driving mechanism, and an expulsion activating mechanism. The cutting cylinder has an open end that is freely movable longitudinally. The structure includes a guide with which the weight engages to move along a weight path between first and second endpoints, when propelled by the weight propulsion device, causing the weight to strike the cutting cylinder and urge the cutting cylinder in the longitudinal direction. The soil expulsion piston moves inside the cutting cylinder along its axis. The piston driving mechanism transfers force from the weight propulsion device to the soil expulsion piston to drive the (Continued)

soil expulsion piston towards the open end. The expulsion activating mechanism engages and disengages the piston driving mechanism in relation to the weight propulsion device.

13 Claims, 20 Drawing Sheets

(51) Int. Cl.
*A01B 45/00* (2006.01)
*B25D 9/04* (2006.01)
*B25D 9/12* (2006.01)
*E21B 7/02* (2006.01)
*E21B 11/00* (2006.01)

(52) U.S. Cl.
CPC ............... *B25D 9/12* (2013.01); *E21B 7/027* (2013.01); *E21B 11/005* (2013.01); *B25D 2250/241* (2013.01)

(56) References Cited

U.S. PATENT DOCUMENTS

| | | | |
|---|---|---|---|
| 3,696,873 A * | 10/1972 | Anderson | E21B 11/02 173/132 |
| 4,947,938 A | 8/1990 | Fricke et al. | |
| 5,088,562 A * | 2/1992 | Shields | A01B 1/243 73/864.45 |
| 5,662,179 A | 9/1997 | Falk | |
| 6,386,294 B1 * | 5/2002 | Best | A01B 1/165 30/316 |
| 6,739,401 B1 * | 5/2004 | Sova | A01B 1/24 111/106 |
| 7,900,710 B2 * | 3/2011 | Hansen | A01C 5/02 408/68 |
| 2008/0179068 A1 * | 7/2008 | Webb | A63B 57/357 206/223 |
| 2017/0356262 A1 | 12/2017 | Froemming | |

* cited by examiner

METHOD AND DEVICE FOR MAKING A HOLE IN A GOLF GREEN

The present invention relates to a method and a device for making a hole in a golf green. The invention also relates to a method and a device for moving a hole in a golf green from a second location to a first location.

In the game of golf, the object is to get the golf ball in a hole using as few strokes as possible. The hole in question is normally located in an area with short-kept grass called a "green". Due to the wear on the grass of such a golf green during play, by players walking around and playing near the hole, the hole is conventionally moved around the green regularly. It may also be the case that hole positions presenting different levels of playing difficulty are desirable in various situations, such as during golf competitions.

When the hole is moved from the second to the first location, a new hole must be made in is the first hole location. This typically entails lifting a cylinder of soil and grass, leaving a cylindrical hole in the green ground. The lifted cylinder can then be placed in the old hole, at the second location, providing the filled-in hole at the second location with an intact grass surface. This way, the hole can be moved frequently without damaging the green.

However, conventional hole cutters suffer from various problems.

The hole to be cut is normally about 20 cm deep and 10 cm of diameter. Some conventional cutters use a combination of twisting and pushing on a circular-cylindrical cutting blade, which is worked downwards into the soil until the desired depth is reached. This process may very well take several minutes to finalize, and it would be desirable to shorten this time.

Also, the process of releasing the lifted soil cylinder into the old hole, which is normally achieved via a manually actuated lever, is time consuming.

Since such hole cutting devices are used outdoors, under rough conditions and for prolonged periods of time, it is also important that they are built from sturdy components that can provide reliable operation for long periods of time. At the same time, it is important that a hole cutter is not too heavy or bulky, so that it can be handled be green-keepers when out and about on the golf course.

The present invention solves the above described problems.

Hence, the invention relates to a device for making a hole in a golf green, the device having a longitudinal direction, a radial direction and an angular direction, the device comprising a cutting cylinder with an axis parallel to the longitudinal direction and an open end being freely movable along the longitudinal direction; a structure, comprising guide means defining a weight path having a first endpoint and a second endpoint; a weight, in engagement with said guide means to be guidedly movable along said weight path; a is weight propulsion device, arranged to propel the weight reciprocally along said weight path between said first endpoint and said second endpoint so that the weight strikes against the cutting cylinder when the weight is at a location along said weight path, in turn urging the cutting cylinder in the longitudinal direction; and a soil expulsion piston, movable inside said cutting cylinder along said longitudinal axis, said device being characterised in that the device further comprises a piston driving mechanism, arranged to transfer a force, provided by said weight propulsion device, to the soil expulsion piston to drive the soil expulsion piston in a direction towards said open end of the cutting cylinder; and an expulsion activating mechanism, arranged to switch the piston driving mechanism on and off by engaging and disengaging, respectively, the piston driving mechanism in relation to the weight propulsion device.

The invention also relates to a method for making a hole in a golf green, said method being characterised in that the method comprises the steps a) providing a device according to any one of the preceding claims; b) positioning said device in a first location on the golf green oriented so that its longitudinal direction is vertical; c) activating the weight propulsion device to move the weight reciprocally and as a result repeatedly striking the cutting cylinder so that the cutting cylinder by each stroke is driven down into the ground; and d) when a desired hole depth is reached, lifting the cutting cylinder upwards, thereby removing a resulting soil cylinder from the hole.

In the following, the invention will be described in detail, with reference to exemplifying embodiments of the invention and to the enclosed drawings, wherein.

In FIGS. 1a-1d, the device is shown with its weight in a topmost position.

Figure 1A:
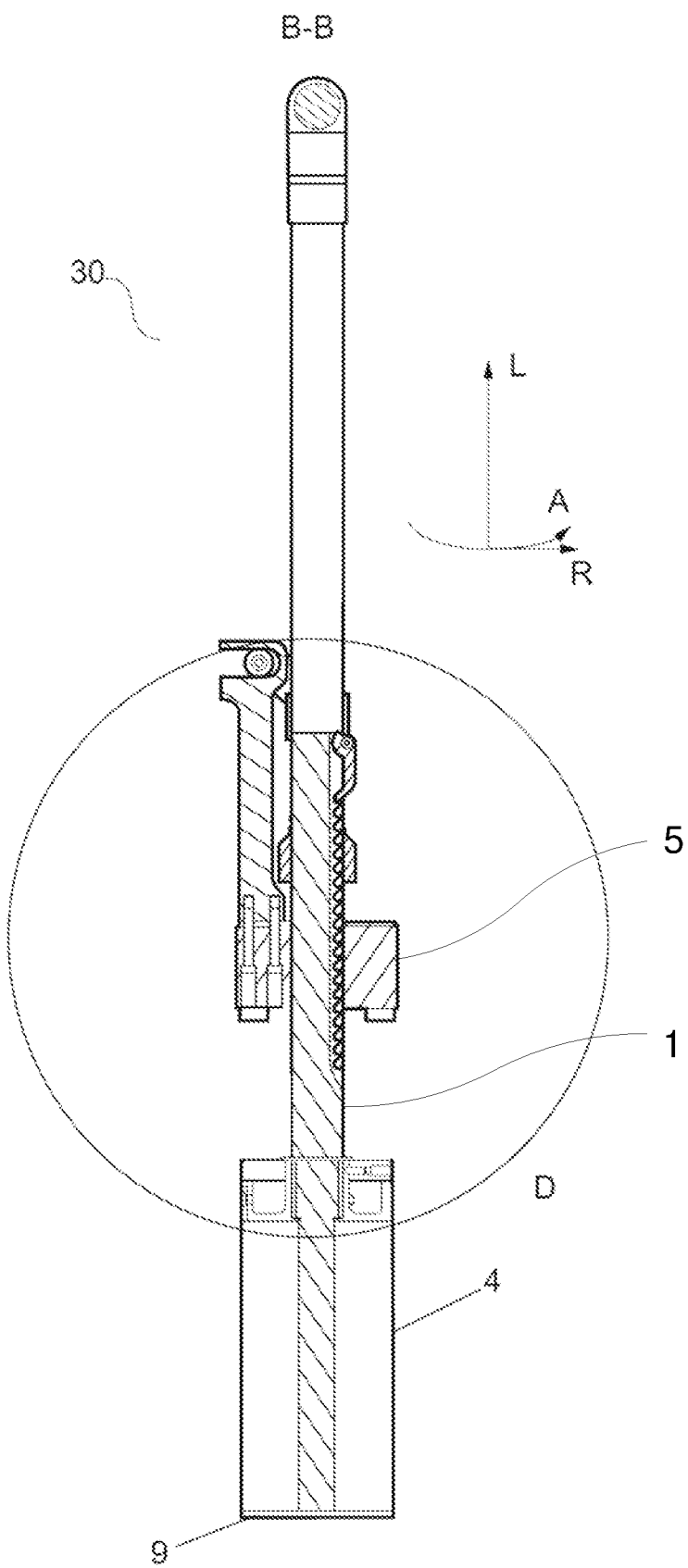
FIG. 1a shows a device according to the invention, in a cross-section through plane B-B.
Figure 1B:
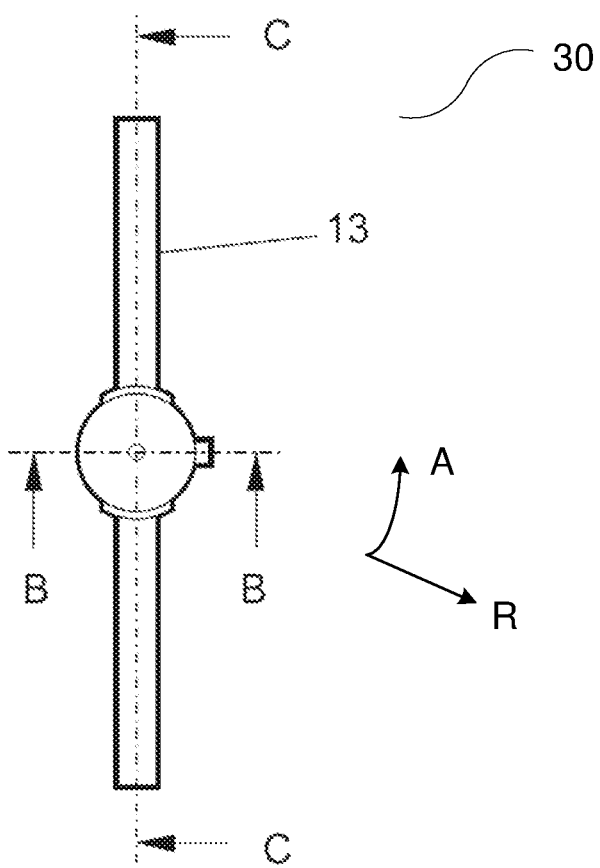
FIG. 1b shows a top view of the device, illustrating planes B-B and C-C.
Figure 1C:
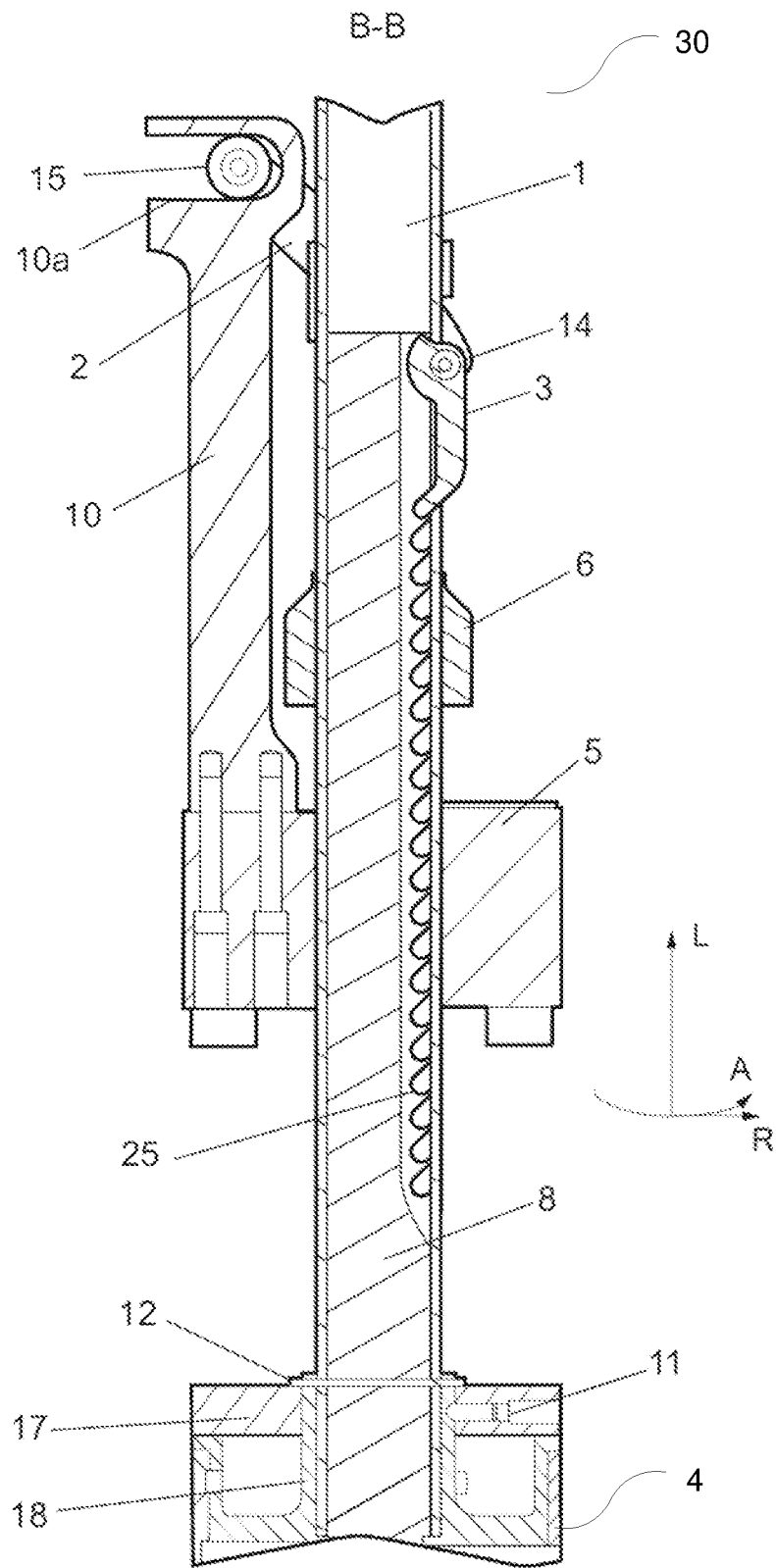
FIG. 1c shows a cross-sectional view through plane B-B of detail D of the device.
Figure 1D:
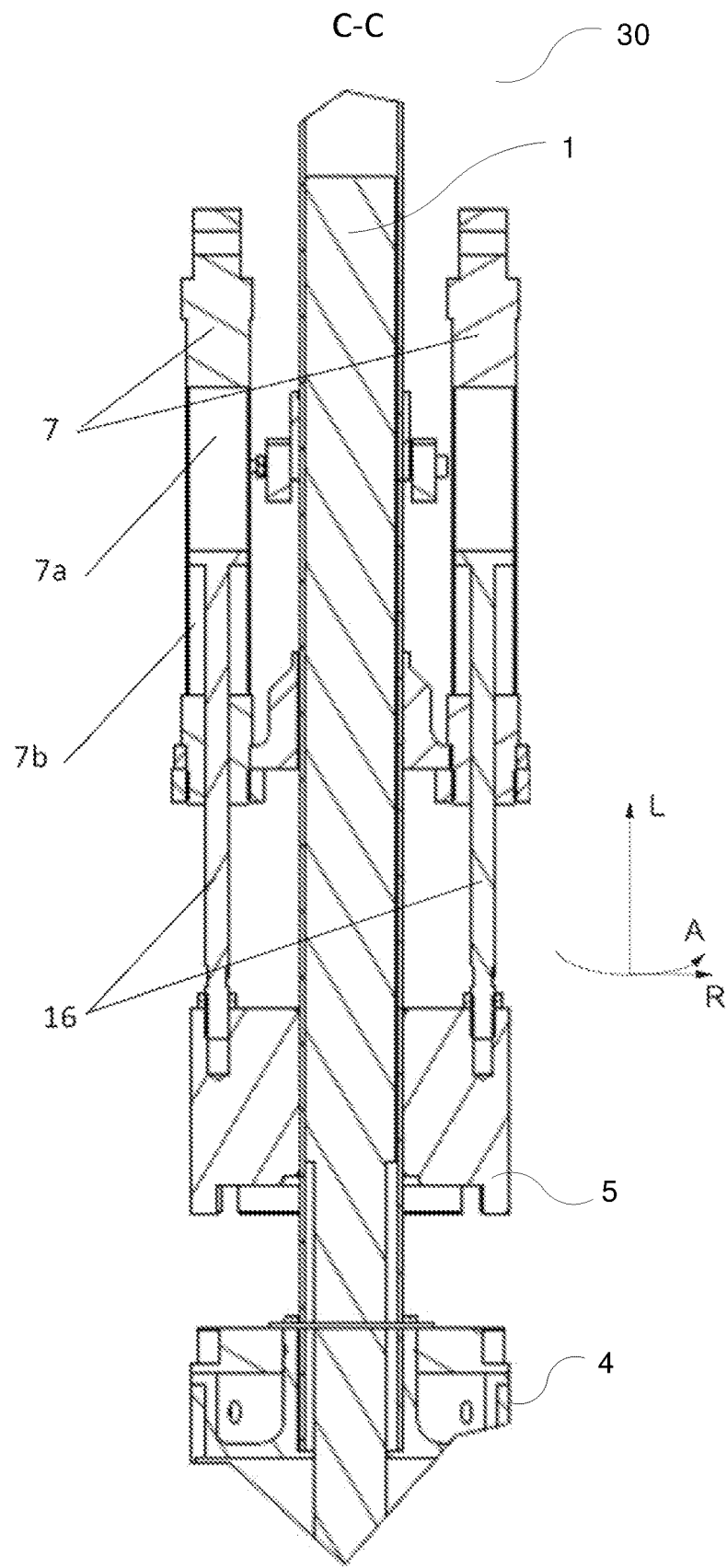
FIG. 1d shows a cross-sectional view through plane C-C of detail D of the device.
Figure 1E:
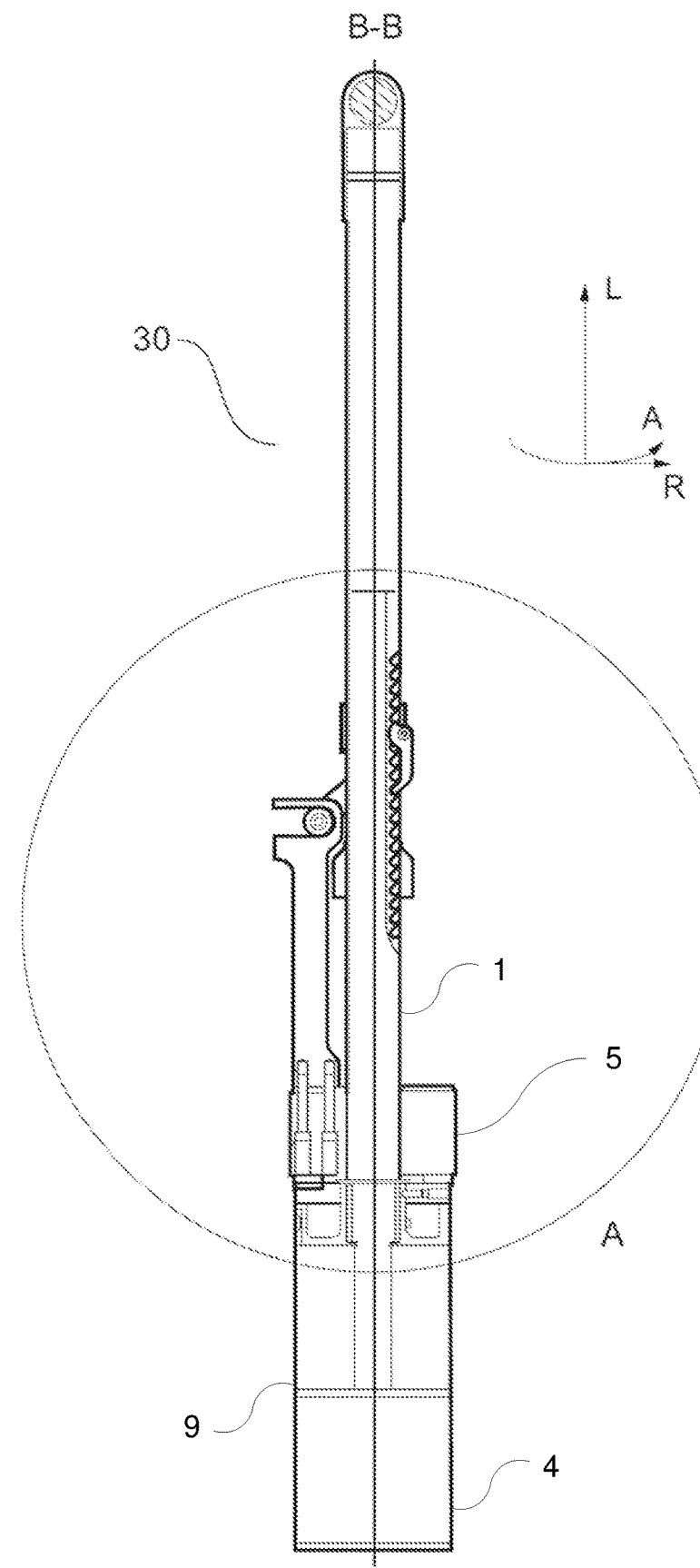
Figure 1F:
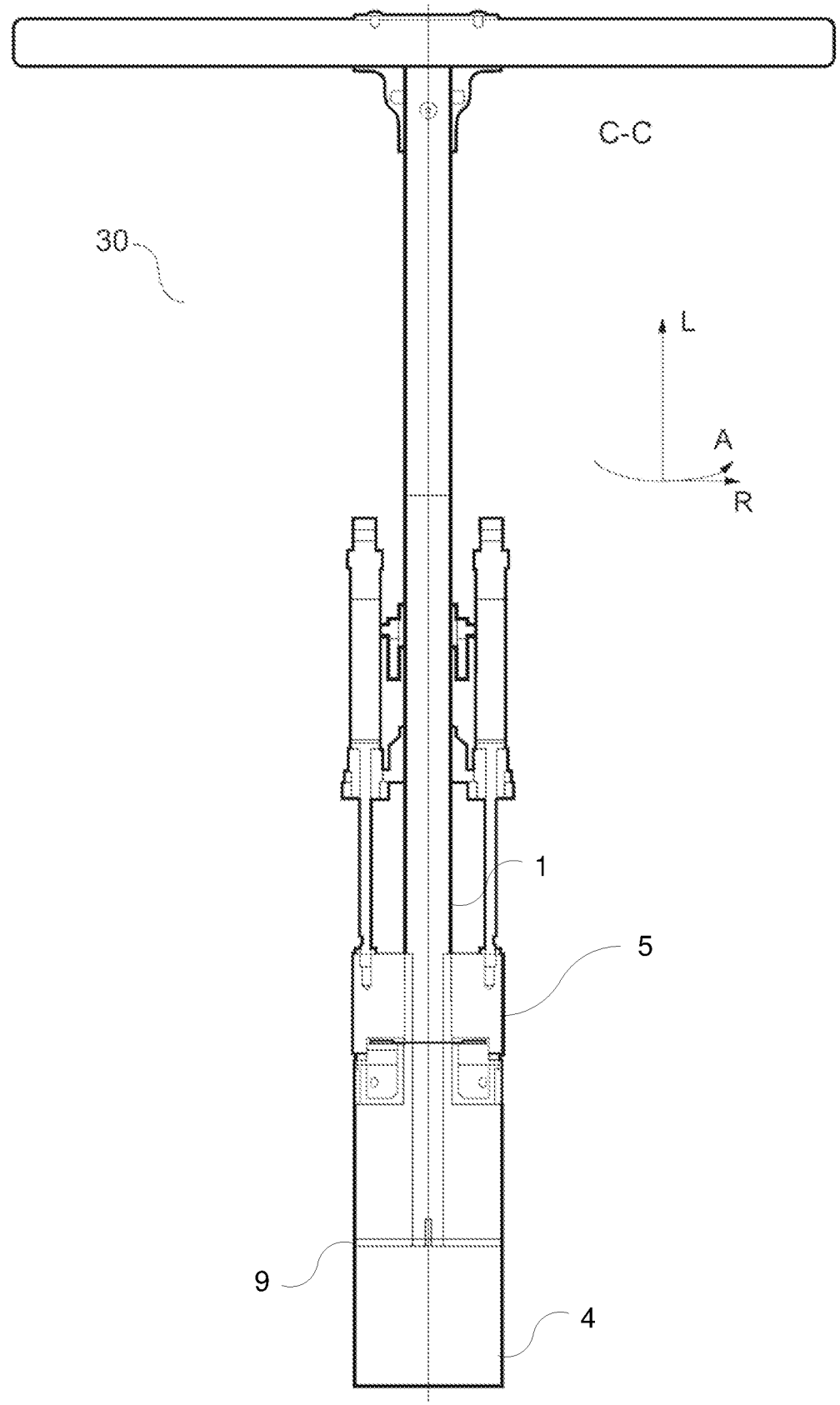

FIG. 1e shows the device in a cross-section through plane B-B;

FIG. 1f shows the device in a cross-section through plane C-C; and

Figure 1G:
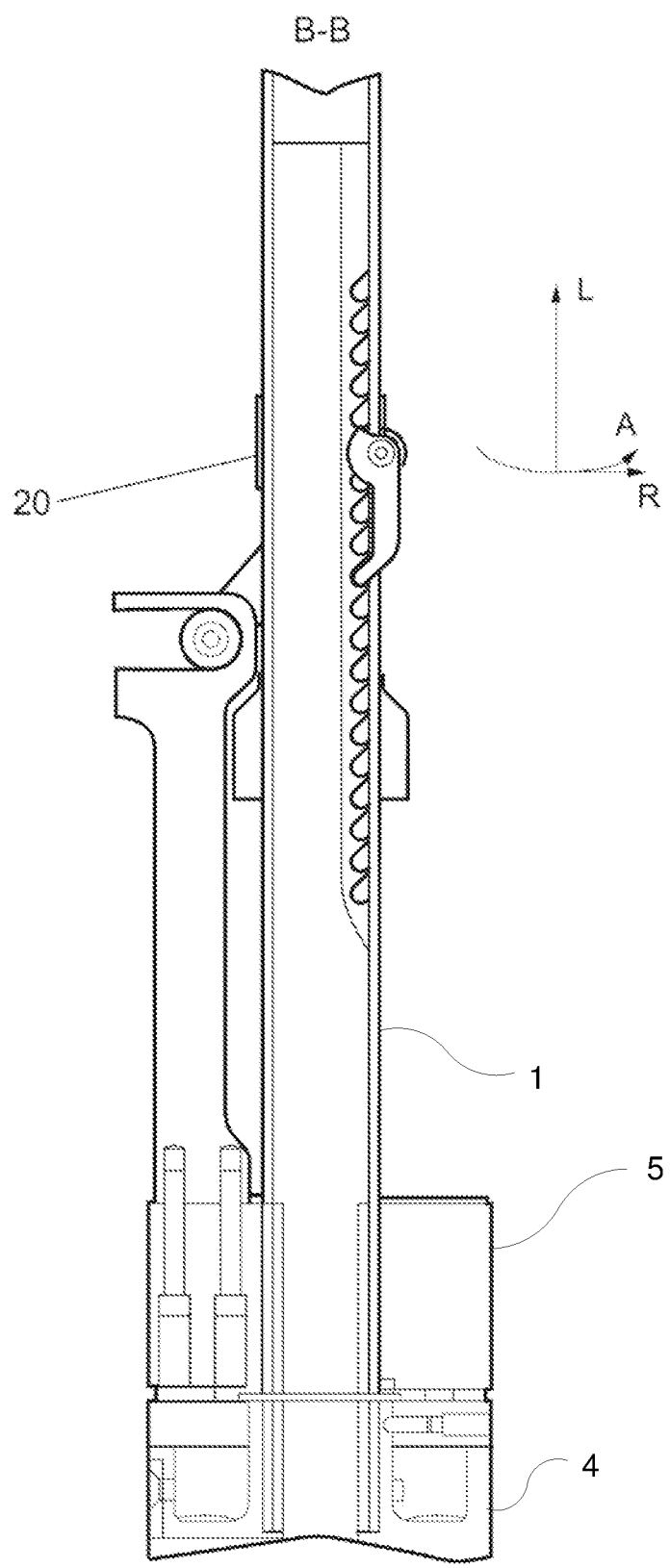

FIG. 1g shows a cross-sectional view through plane B-B of detail A of the device.

In FIGS. 1e-1g, the device is shown with its weight in a lowermost position.

Figure 2A:
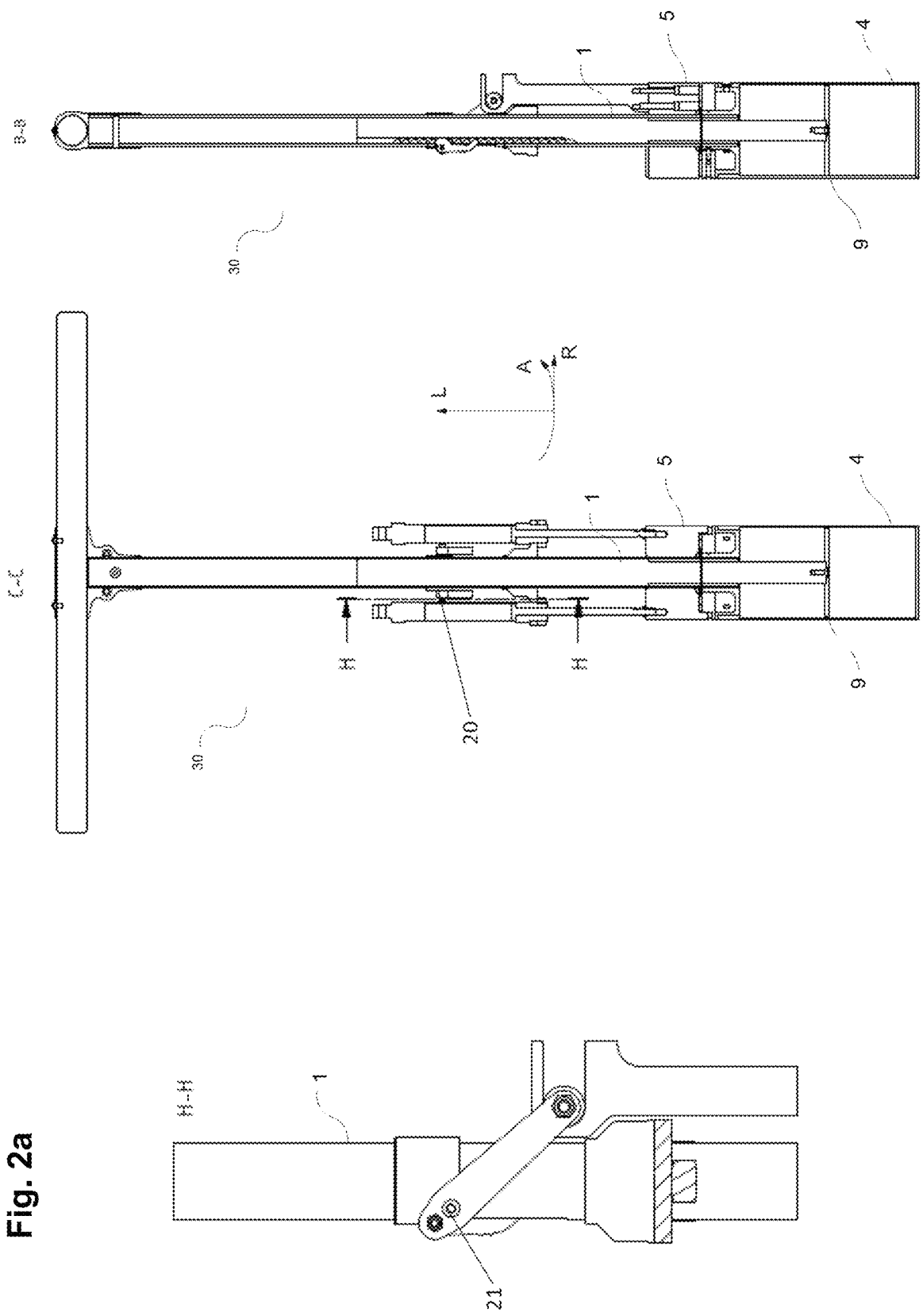
Figure 2B:
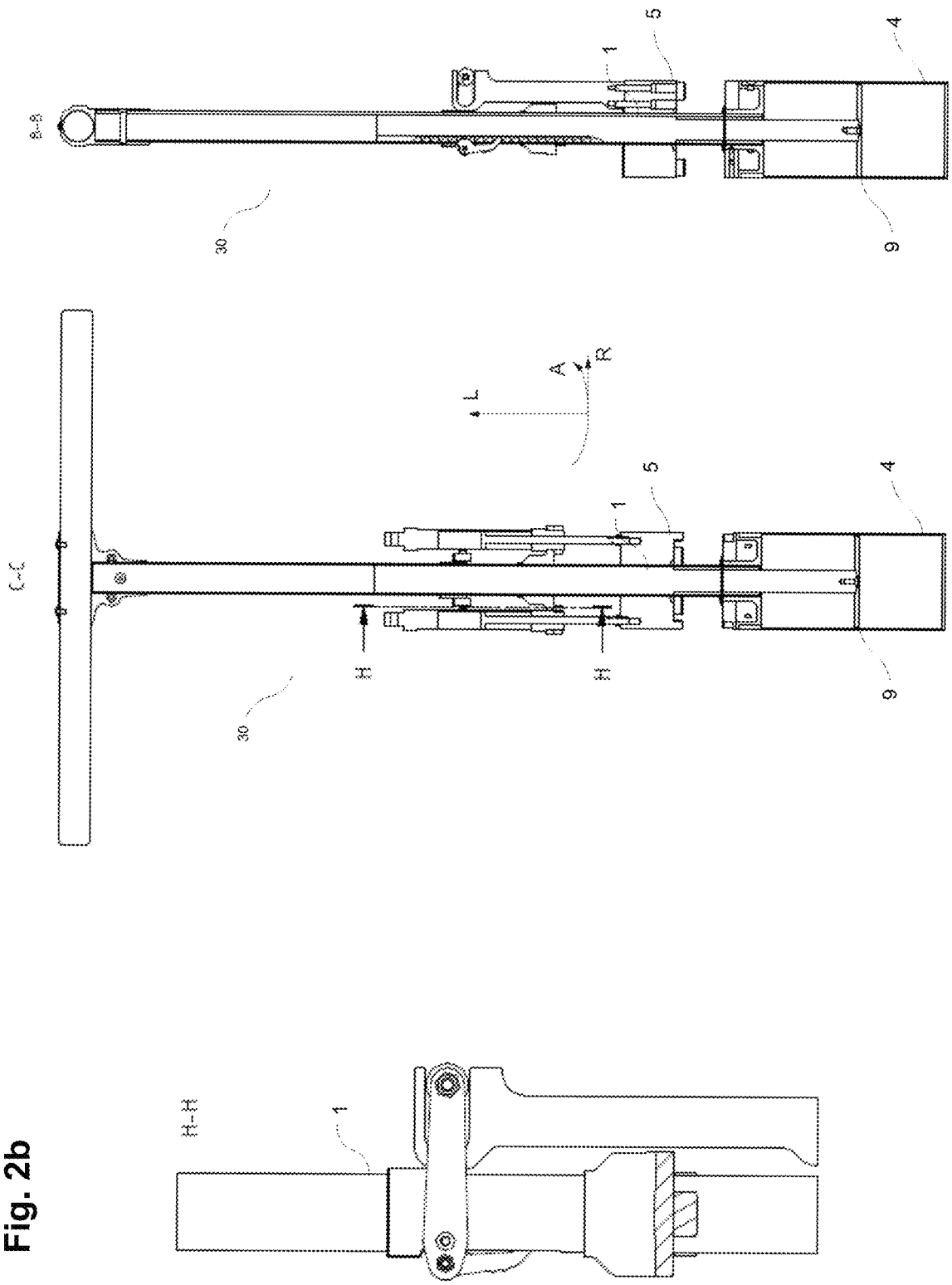
Figure 2C:
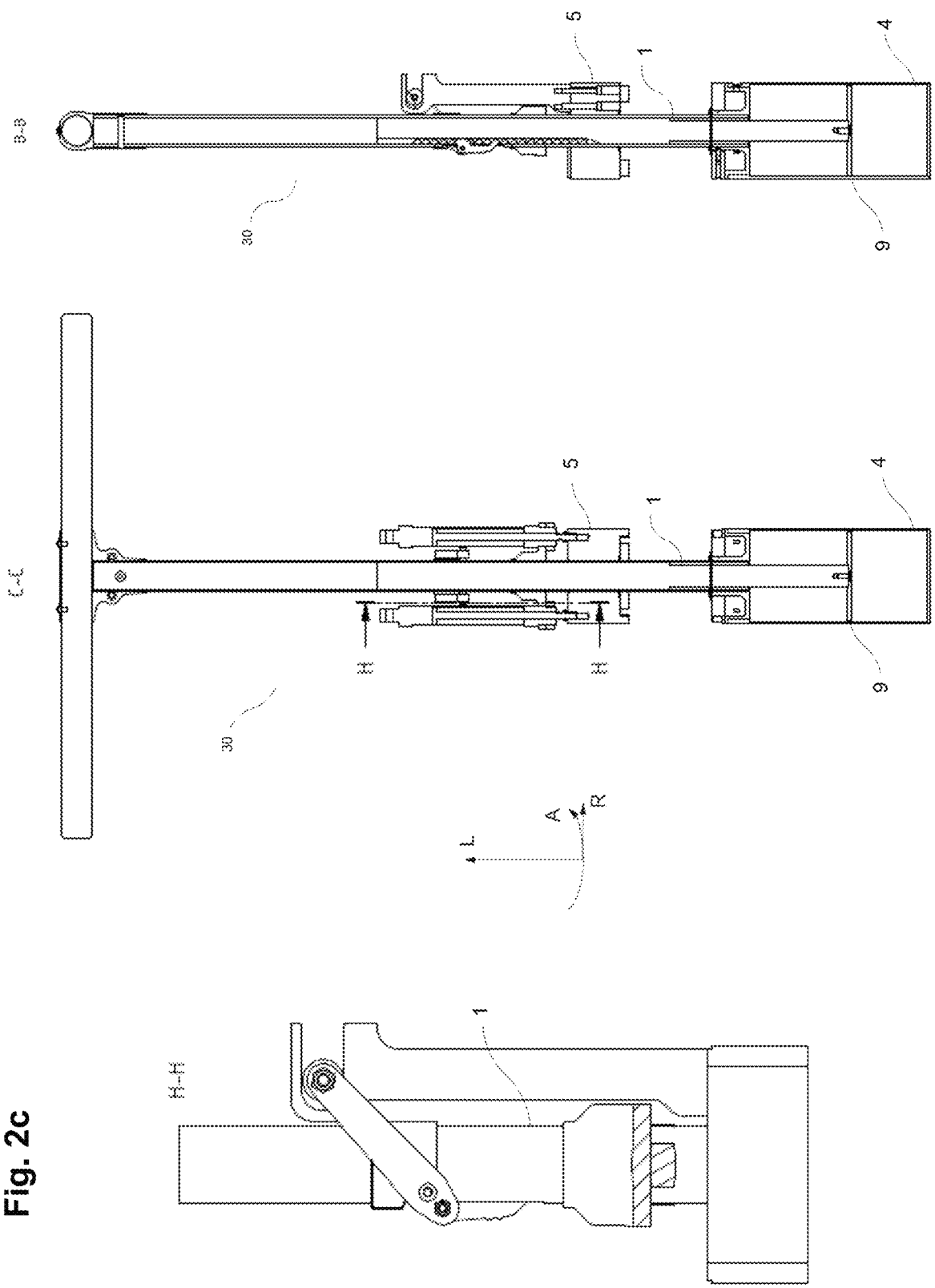

FIG. 2a illustrates, in order from left to right, a side detail view of detail H of the device, a cross-section through plane C-C of the device and a cross-section through plane B-B of the device, when the weight is in said lowermost position;

FIG. 2b illustrates, in order from left to right, a side detail view of detail H of the device, a cross-section through plane C-C of the device and a cross-section through plane B-B of the device, when the weight is in an intermediate position; and FIG. 2c illustrates, in order from left to right, a side detail view of detail H of the device, a cross-section through plane C-C of the device and a cross-section through plane B-B of the device, when the weight is in said uppermost position.

Figure 3A:
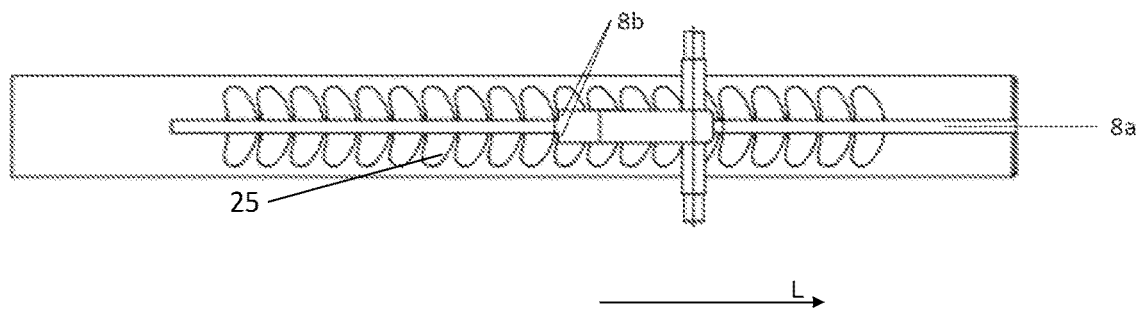
Figure 3B:
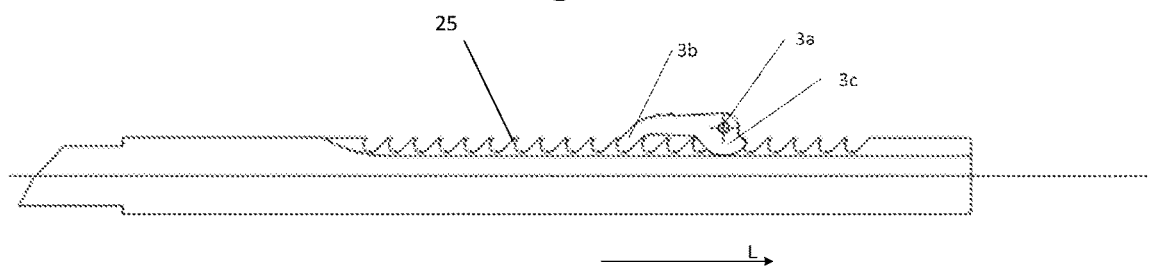
Figure 3C:
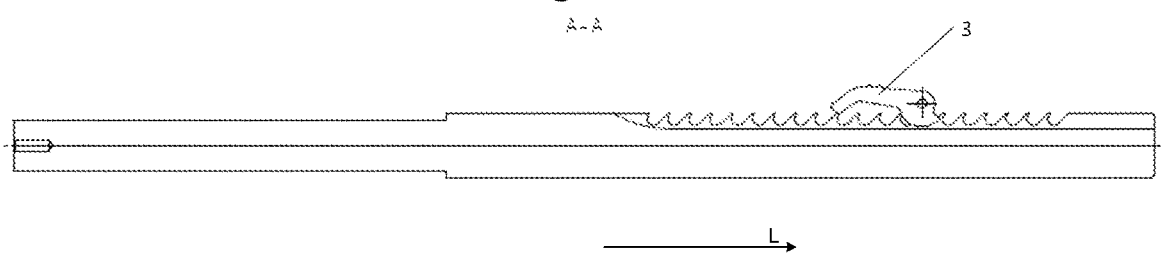
Figure 3D:
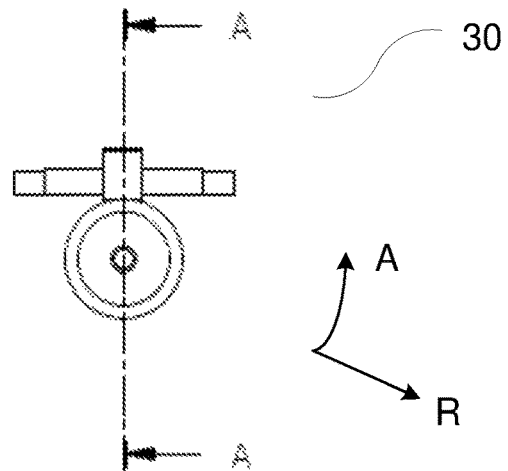
Figure 3E:
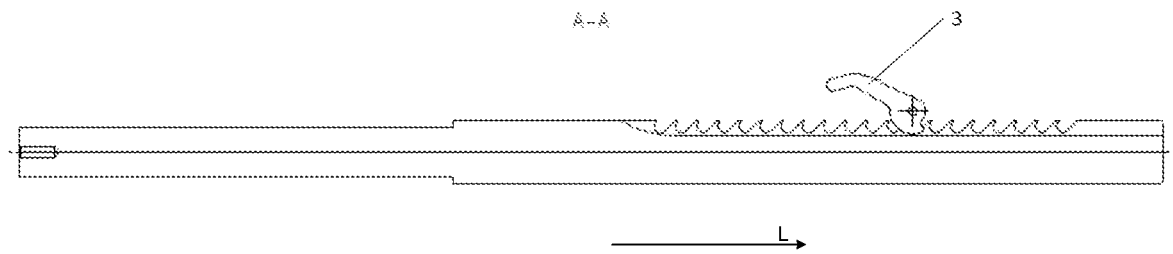
Figure 3F:
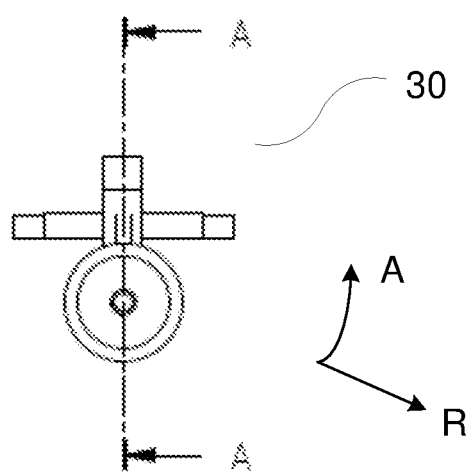
Figure 3G:
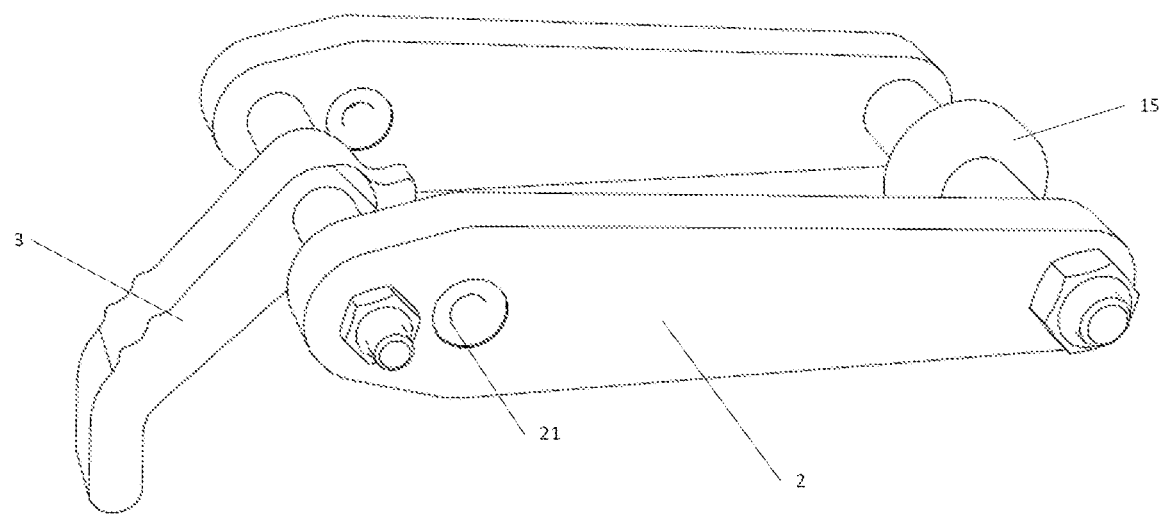

FIG. 3a illustrates a first side view of a teeth bar of the device with a rocker in a fully engaged state with respect to the teeth of the teeth bar;

FIG. 3b illustrates a second side view of a teeth bar of the device with said rocker in said fully engaged state;

FIG. 3c illustrates said second side view of the teeth bar of the device with said rocker in a partly disengaged state;

FIG. 3d illustrates a cross-section through a plane A-A of the view shown in FIG. 3c;

FIG. 3e illustrates said second side view of the teeth bar of the device with said rocker in a fully disengaged state; and FIG. 3f illustrates a cross-section through a plane A-A of the view shown in FIG. 3e; and FIG. 3g is a perspective detail view of said rocker.

Figure 4:
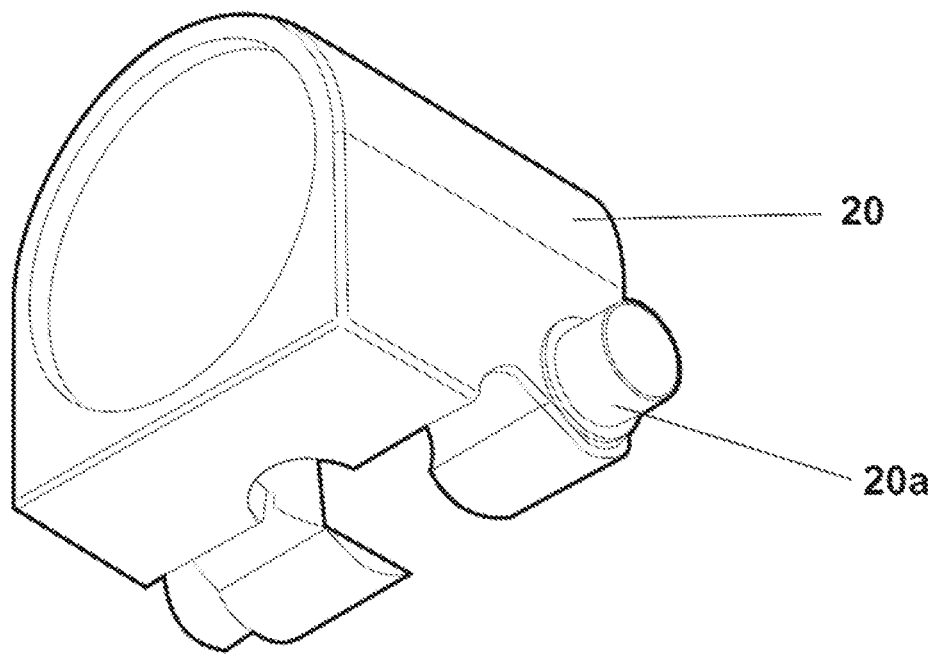

FIG. 4 is a perspective detail view of a lever holder of the device.

Figure 5A:
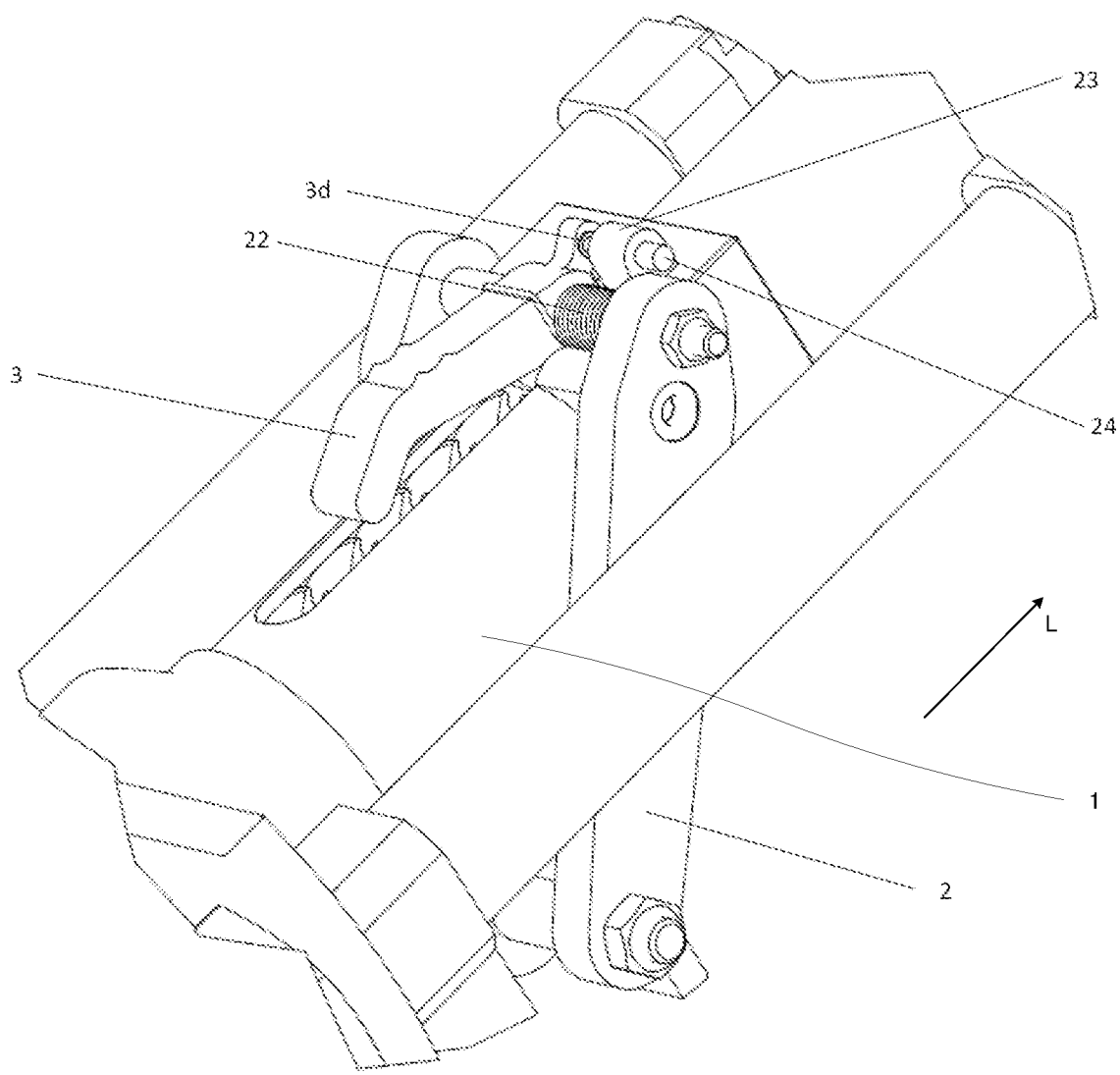
Figure 5B:
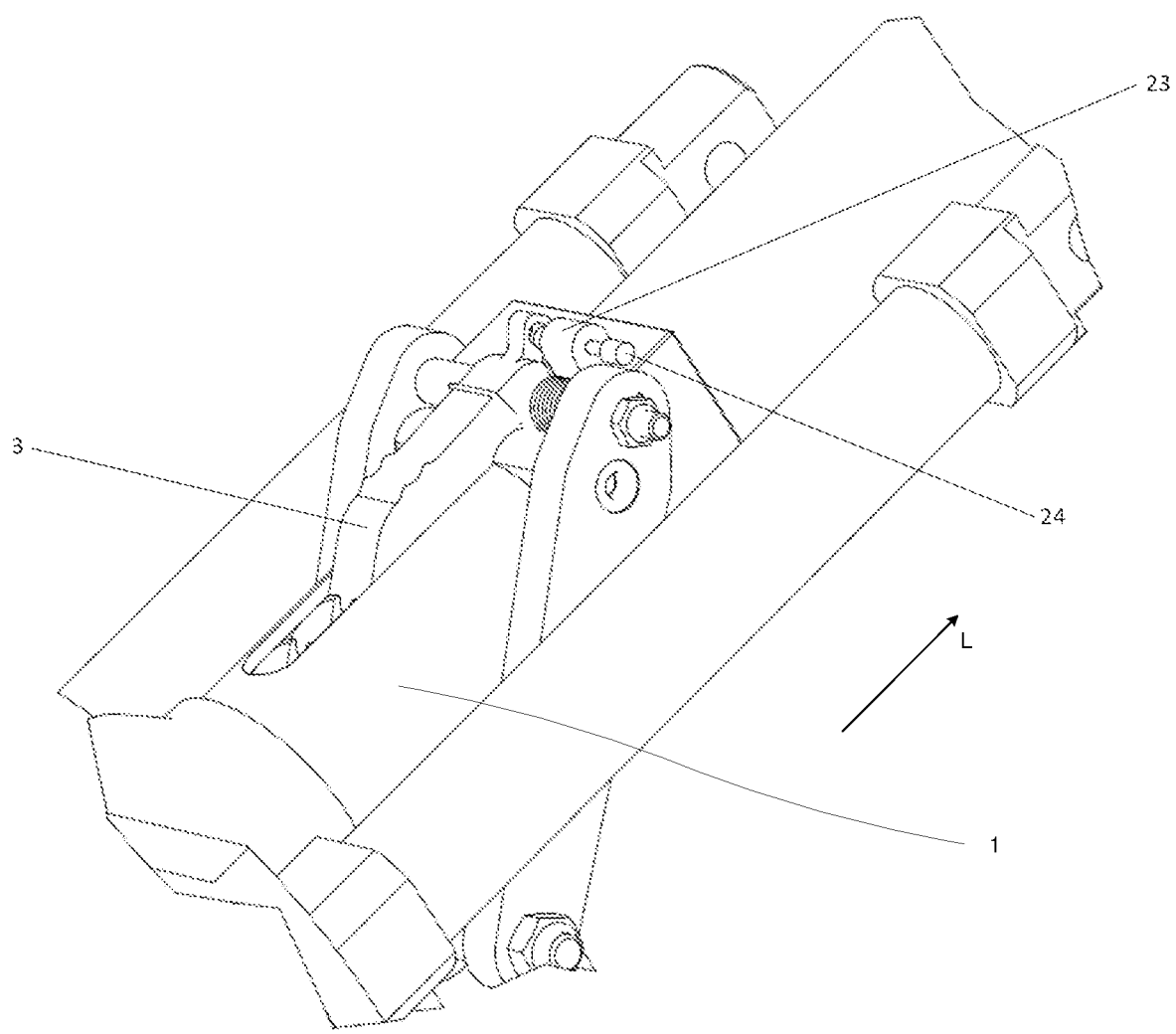

FIG. 5a is a perspective detail view of the teeth bar and the rocker in a fully disengaged state; and FIG. 5b is a perspective detail view of the teeth bar and the rocker in a fully engaged state.

Figure 6A:
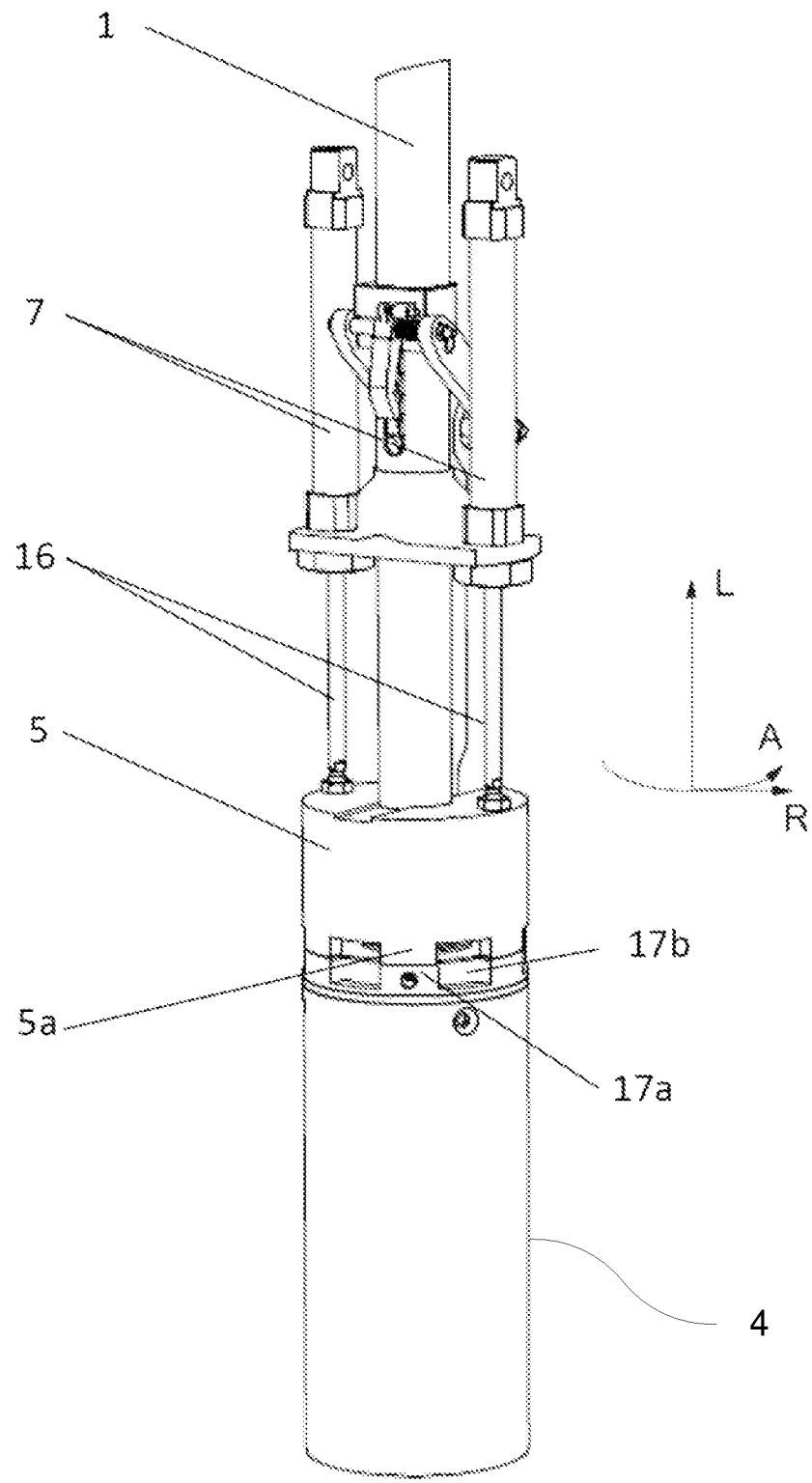
Figure 6B:
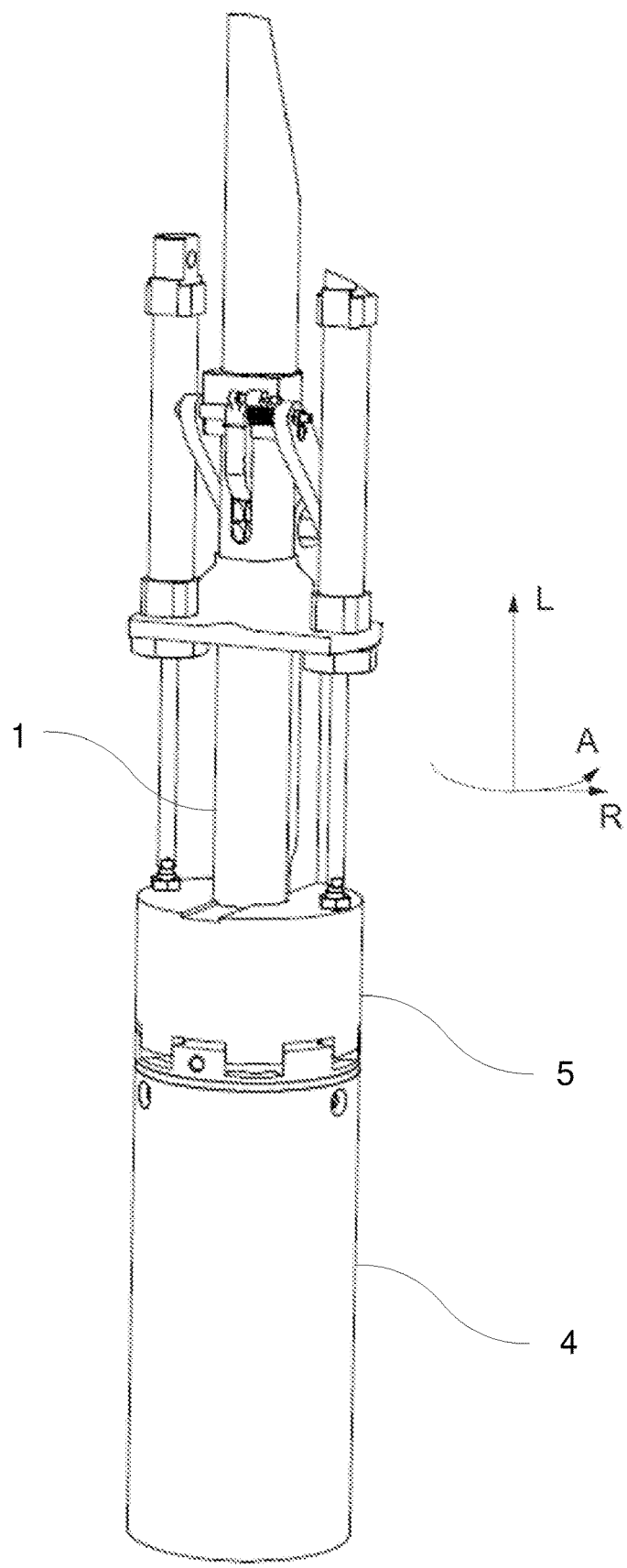

FIG. 6a is a perspective detail view of a lower part of the device with a cutting cylinder engagement part of the device in an engaged state; and FIG. 6b is a perspective detail view of the lower part of the device with the cutting cylinder engagement part of the device in a disengaged state.

Figure 7:
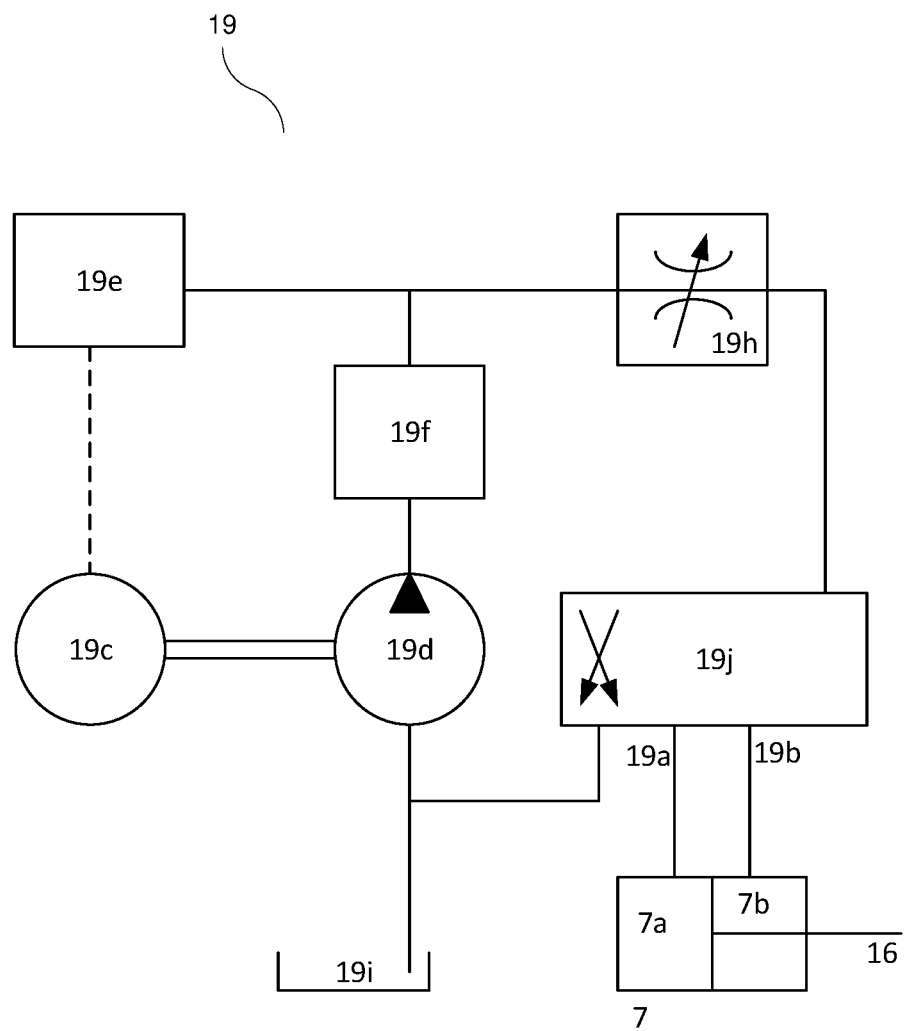

FIG. 7 is a diagram illustrating a hydraulic system of the device.

Figure 8:
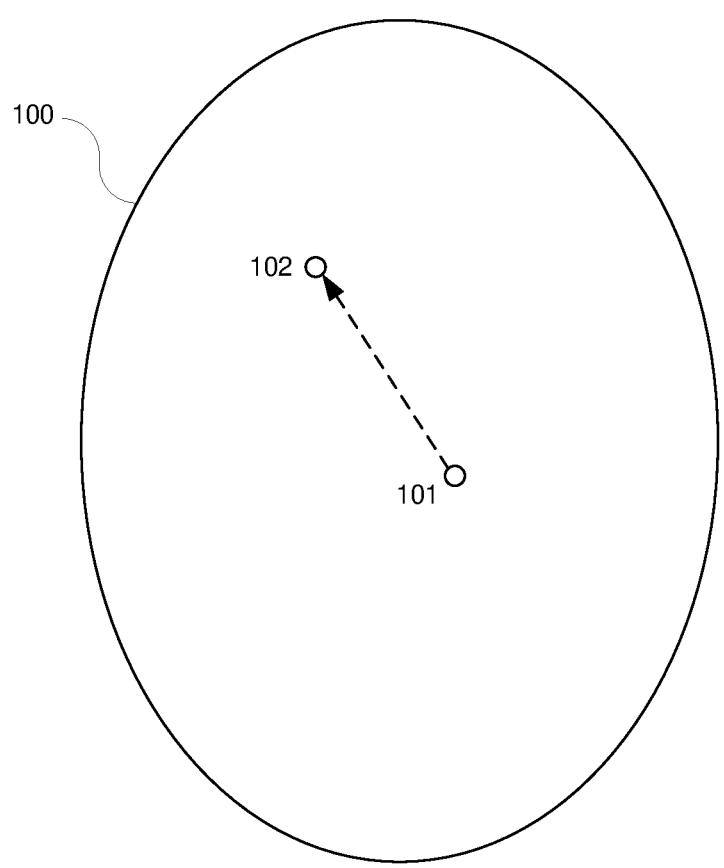

FIG. 8 illustrates a golf green according to the invention.

Figure 9:
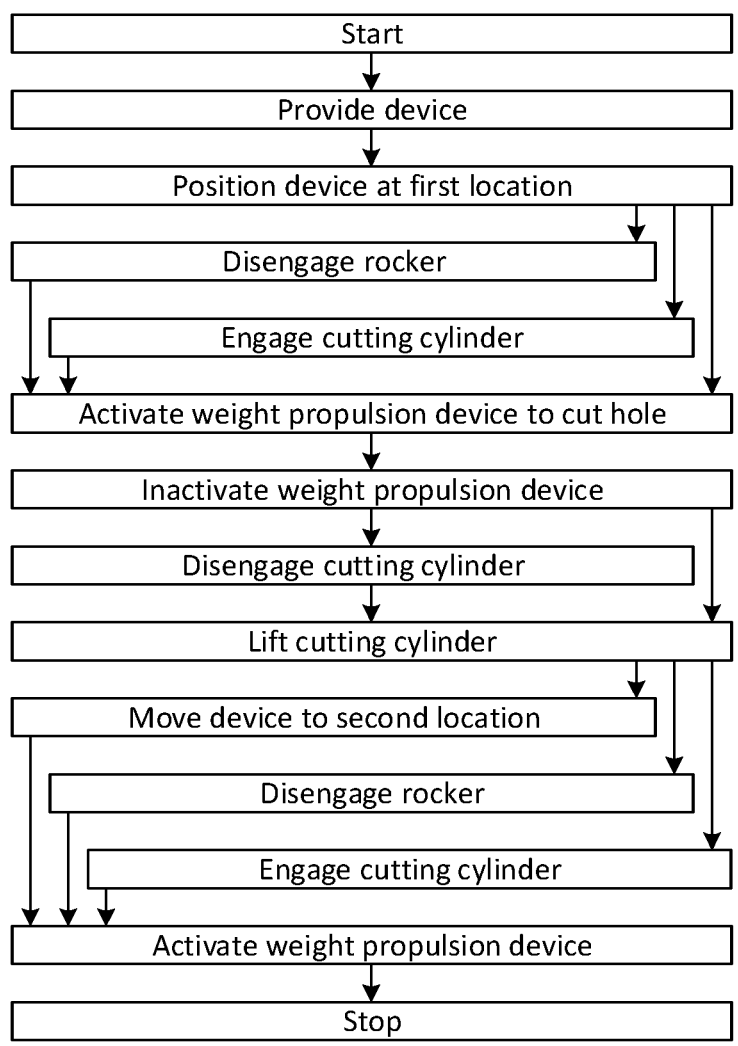

FIG. 9 is a flowchart illustrating a method according to the invention.

All Figures share the same reference numerals for the same parts. FIGS. 1a-6b illustrate one and the same exemplifying embodiment of the present invention.

Hence, the Figures show a device 30 for making a hole in a golf green 100 (see FIG. 8). As is seen in FIG. 1a, the device 30 is associated with a longitudinal direction L, a radial direction R and an angular direction A, together forming a polar coordinate system.

The device 30 is generally arranged for use in the orientation shown in FIG. 1a, with the longitudinal direction L vertically oriented or at least substantially vertically oriented (depending on any sloping green 100 surface, for instance). If not otherwise stated herein, the terms "downwards", "upwards" etc. relate to the operating orientation shown in FIG. 1a, where down in FIG. 1a corresponds to down in reality. However, "down" may mean "plumb", "perpendicular to the green 100 surface" or something therebetween. Generally, the weight 5 (see below) will move vertically or at least substantially vertically during operation.

The device 30 generally comprises a cutting cylinder 4, having a cylinder axis that runs in parallel to said longitudinal direction L and an open lower end.

The cutting cylinder 4 is arranged to be driven down into the soil on the green 100 by a driving force being applied onto the cutting cylinder 4 from a top side of the cylinder 4. This downwards driving direction is the downwards direction in FIG. 1a.

In order to be able to cut down into the soil, the open lower end of the cutting cylinder 4 may be provided with a sharp cutting edge. It may be manufactured from a suitable metal material, and in particular the cutting edge may be made from a steel quality having high abrasive resistance.

The cutting cylinder 4 may be have a circular cylindrical shape, so as to achieve a circular hole in the green 100.

An internal cylinder height (in the longitudinal direction L) of the cutting cylinder 4, being capable of holding a cylinder-shaped piece of cut soil, may at least correspond to the depth of a golf hole, which is at least 4.00 inches (10.2 cm). Preferably, the internal cylinder height of the cutting cylinder 4 is at least 15 cm, or even at least 20 cm. The cutting cylinder 4 may be provided with depth-limiting means, to stop the penetration of the cutting cylinder 4 when a user-defined cutting depth, such as 7.50 inches (19.1 cm) has been reached. Such depth-limiting means may be implemented in many different ways, such as selecting and mounting one from a collection of at least two available cutting cylinders 4 each having a respective internal cylinder space height corresponding to the desired cutting depth, or by providing a movable cutting-limiting mechanism, such as a plate, that can be set into one of several fixed or continuously adjustable positions.

The cutting cylinder 4 may be provided with through holes or other suitable ventilation openings at its upper end, allowing air to escape from the cutting cylinder 4 as its opposite is lower end penetrates the soil.

The device 30 comprises a weight 5, which is used to drive the cutting cylinder 4 down into the soil by the weight 5 repeatedly striking with force onto the cutting cylinder 4.

The device 30 comprises a rigid structure, comprising guide means defining a weight path having a first endpoint and a second endpoint. In the embodiment illustrated in the Figures, this is exemplified by the weight 5 being provided with a central hole receiving a metal pole 1 running along the device 30 in the longitudinal direction L. In this case, the structure is the pole 1. The weight 5 is slidingly engaged with the pole 1 so that the weight can freely move up and down, along the longitudinal direction L, along the pole, towards and away from the cutting cylinder 4. The rigid structure may also be rigidly connected to the cutting cylinder 4.

It is understood that the pole 1 constitutes a guide means 1 arranged so that the weight 5 is guidedly movable along said weight path. It is understood that such a weight path, mechanically defining a guide path allowing the weight 5 to move along the longitudinal direction L towards and away from the cutting cylinder 4, can be achieved in many different ways, such that using a cylinder in which the weight 5 can move and/or using more than one parallel pole 1, and that the solution shown in the Figures is merely an example.

As mentioned, the weight path has a first endpoint and a second endpoint. The first endpoint, defining a location of the weight 5 furthest away from the cutting cylinder 4, is shown in FIG. 2c, while the second endpoint, defining a location of the weight closest to the cutting cylinder 4, is shown in FIG. 2a. FIG. 2b shows an intermediate position of the weight 5 along said weight path.

In the example shown in the Figures, the weight path is a straight path through space, arranged to be vertical or at least substantially vertical when operating the device 30. This is the preferred case, with the purpose of maximising the striking impact of the weight 5 onto the cutting cylinder 4. However, it is understood that the weight path can also be curvilinear.

Furthermore, the device 30 comprises a weight propulsion device, arranged to propel the weight 5 reciprocally along said weight path between said first endpoint and said second endpoint, so that the weight 5 strikes against the cutting cylinder 4 when the weight 5 is at a location along said weight path, whereby the striking impact of the weight 5 onto the cutting cylinder 4 in turn urges the cutting cylinder 4 to move in the longitudinal direction L (downwards, towards and into the soil). Hence, while striking the cutting cylinder 4, the weight will typically not fully reach the lower endpoint during its reciprocal movement along the weight path.

In the example shown in the Figures, the weight propulsion device comprises a pair of pistons 16 that are rigidly connected to the weight 5 and driven by a force generating mechanism to push the pistons 16, and as a result the weight 5, along the longitudinal direction L. It is, however, realized that such a weight propulsion device may be arranged in many different ways, such as using a linear electric motor or a screw drive.

It is preferred that the weight propulsion device drives the weight 5 in a reciprocal manner along said weight path, towards and away from the cutting cylinder 4 along the longitudinal direction L. Hence, the weight propulsion device preferably applies a lifting force to the weight 5 on its way away from the cutting cylinder 4, lifting the weight 5 upwards along the weight path.

It is also preferred that the weight propulsion device applies a driving force to the weight 5 in addition to gravity, so that the weight 5 is accelerated towards the cutting cylinder 4 before striking the later at an acceleration which is larger than the acceleration of gravity along the weight path.

The device 30 furthermore comprises a soil expulsion piston 9, which is movable inside the cutting cylinder 4 along said longitudinal axis. In particular, the soil expulsion piston 9 is movable inside the internal cylinder space accommodating said cut cylindrical piece of is soil, and arranged to push said soil cylinder out from the cutting cylinder 4, through said open lower end of the cutting cylinder 4. In the exemplifying embodiment illustrated in the Figures, the soil expulsion piston 9 comprises a central axis, arranged to be parallel with the longitudinal direction L (and also parallel with said soil expulsion piston 9), connected to and arranged to drive a circular plate for pushing the soil cylinder out. The circular plate may have a shape complementary to, and of slightly smaller size as, a cross-section of said internal cylindrical space of the cutting cylinder 4.

According to the present invention, the device 30 also comprises a soil expulsion piston 9 driving mechanism, arranged to use the same weight propulsion device used to drive the weight for striking impact onto the cutting cylinder 4 to also drive the soil expulsion piston 9 to push out the cut soil cylinder from the cutting cylinder 4.

Hence, the soil expulsion piston 9 driving mechanism is arranged to transfer a force, provided by said weight propulsion device, to the soil expulsion piston 9 to in turn drive the soil expulsion piston 9 in a direction towards said open end of the cutting cylinder 4.

Furthermore, the device 30 comprises an expulsion activating mechanism, arranged to switch the soil expulsion 9 piston driving mechanism on and off by engaging and disengaging, respectively, said piston driving mechanism in relation to the weight propulsion device.

Hence, the device 30 has at least two modes of operation—a cutting cylinder 4 driving mode, in which the device 30 is operable for driving the cutting cylinder 4 down into the soil by the weight 5 repeatedly striking onto the cutting cylinder 4 as described above ("cutting mode"); and a soil expulsion mode, in which the device 30 is operable for expelling the cut soil cylinder out from the cutting cylinder by allowing the same driving mechanism that drives the weight 5 to push the soil expulsion piston 9 to expel said soil cylinder as described above ("expulsion mode"). By activating the expulsion activating mechanism, a user of the device 30 can switch between these two modes.

It is realized that the expulsion activating mechanism can be designed in many different ways. In the example illustrated in the Figures, the pistons 16 are mechanically connected, via a lever 2 held by a holding means 20 having a pivot pin 20a, and a needle bearing 21, a rocker 3 and a set of engagement teeth, to the expulsion piston 9 (see below). In such a construction, the weight 5 is reciprocally driven along said weight path also in the explucion mode.

This may, however, not be the case in alternative embodiments, wherein the weight 5 may be completely disengaged due to an activation of the expulsion activating mechanism. For instance, the expulsion activating mechanism may be in the form of a turnable (the angular direction A) cam plate having a cam profile arranged to provide engagement only between the pistons 16 and the weight 5 in a first angular A position, and to provide engagement only with the pistons 16 and the soil expulsion piston 9 in a second angular A position.

It is, however, preferred that the expulsion activating mechanism is arranged to engage and disengage the soil expulsion piston 9 without affecting an engagement of the weight 5, so that the weight 5 continues to move reciprocally along the weight path even as the expulsion activating mechanism is activated so that the soil expulsion piston 9 is engaged and driven for soil cylinder expulsion. This way, the weight 5 will not risk moving away from potential engagement along said weight path while operating the device 30 in said expulsion mode, so that disengagement of the soil expulsion piston 9 can be made swiftly when the next hole is to be cut.

Also, it is preferred that the soil expulsion piston 9 driving mechanism comprises a lever 2, preferably arranged to provide a linear soil expulsion force which is larger than a corresponding linear weight propulsion force, across a shorter path across which the work in question is performed.

For instance, the weight 5 may be propelled without using a lever (by the weight propulsion device acting directly on the weight 5 without an intermediary lever), while the soil is expulsion piston 9 is propelled using such an intermediary lever 2.

Hence, the present invention combines a hole cutting and soil expulsion mechanism in one and the same device 30, which can be designed to be compact and sufficiently light-weight for being carried around for hand use on a golf course. It can also provide sufficient power to be able to quickly both cut a new hole and then to expel the cut-up soil cylinder. In fact, the present inventors have successfully cut a golf-type hole in grass turf in less than 10 seconds using a device 30 of the type illustrated in the Figures.

As mentioned above, the weight 5 may be brough upwards and downwards along said weight path, which may be a linear weight path, using pistons 16. As is illustrated in the Figures, the pistons 16 are propelled in one respective piston cylinder 7 each, preferably being hydraulic cylinders 7. The pistons 16 may be directly connected, such as using a hinged, however preferably rigid, mechanical connection, to the weight 5.

The cylinders 7 may be fed with a driving fluid, such as a hydraulic fluid (such as water or oil) from an aggregate 19, such as a hydraulic pressure providing system (see FIG. 7 and below). The aggregate 19 comprises at least a fluid tank 19i and a valve 19j for reciprocal driving of the pistons 16.

A piston side 7a (arranged to be pressurized for driving the weight 5 towards impact with cutting cylinder 4) of each piston cylinder is connected to output 19a of the valve 19i, and a piston rod side 7b (arranged to be pressurized for driving the weight 5 away from the cutting cylinder 4) of each piston cylinder is connected to output 19b of the valve 19i.

The weight 5 strikes the cutting cylinder 4, via engagement part 17 (see below) and cutting cylinder 9 fastener 18, so that the cutting cylinder 4 is driven down into the soil of the green 100 to achieve said hole.

In general, about 10 to 25 strokes are required to reach a sufficient depth, depending on the properties of the soil, the mass of the weight 5 and so forth.

As illustrated in FIGS. 2a-2c, the weight 5 is propelled reciprocally and repeatedly between the uppermost position shown in FIG. 2c, via the intermediate position shown in FIG. 2b, to the lowermost position shown in FIG. 2a, and then back to the position shown in FIG. 2c via the position shown in FIG. 2b.

The metal pole 1 may be rigidly connected to the cutting cylinder 4 via fastener 18, comprising a locking washer or pin 12, so that the entire device 30 moves downwards with the cutting cylinder 4 as the weight 5 moves in relation to the metal pole 1 and strikes the cutting cylinder 4 from above.

In a similar manner, the piston cylinders 7 may be rigidly mounted to the metal pole 1 using cylinder fastener 6.

The device 30 illustrated in the Figures furthermore comprises a top handle 13, arranged to allow a user control the orientation of the device 30 during operation thereof. The top handle 13 may be rigidly connected to the cutting cylinder 4.

In a preferred embodiment of the present invention, said soil expulsion piston 9 driving mechanism comprises a set of teeth 25 and a rocker 3 arranged to cooperate with said set of teeth. The rocker 3 comprises an engagement part 3b and is spring-loaded into engagement with said teeth 25. The rocker 3 may be pivotally connected, via needle bearing 14, to the pole 1 and said spring-loading may be a pivotal spring-loading of the rocker 3 in a pivotal direction in which the engagement part 3b pivots radially R inwards towards and against the teeth 25. As illustrated in the Figures, the rocker 3 may comprise a finger-shaped protrusion with the engagement part 3b at its end and the pivotal connection at its opposite end. The finger-shaped protrusion may be generally curvilinear (not straight) for increased strength and compactness.

The teeth 25 are inclined in relation to an engaging geometry of the engagement part 3b of the rocker 3, so that the engagement part 3b engages drivingly with the teeth 25 when is the rocker 3 moves in a translational motion in relation to the teeth 25 in a first direction and so that the engagement part 3b does not engage drivingly (disengages) with the teeth 25 when the rocker 3 moves in a translational motion in relation to the teeth 25 in a second, opposite direction. In particular, each tooth of said teeth 25 may have a protruding part protruding outwards-upwards, as is shown in the Figures, engaging as a shoulder for the engagement part 3b when the rocker is translated downwards in relation to the teeth 25 and not engaging as a shoulder for the engagement part 3b when the rocker is translated upwards in relation to the teeth 25.

Hence, the cooperating engagement parts in the form of the engagement part 3b and the shape of the teeth 25 are arranged to provide an engagement between the rocker 3 and the teeth 25 allowing the rocker 3 to drive the teeth 25 in a downwards longitudinal L direction by said engagement, but so that the rocker 3 slides across said teeth 25 when moved in relation to the teeth 25 in an upwards longitudinal L direction, the spring-loading allowing the rocker 3 to spring out angularly to allow the engagement part 3b slide across each one of said teeth 25 and consequently allowing the rocker 3 to slide upwards across the teeth 25.

The rocker 3 can also be engaged (FIG. 5b) and disengaged (FIG. 5a) by pivoting (such as manually pivoting) the rocker 3 into and out from engagement, respectively, with the teeth 25. By locking the rocker 3 in the disengaged state, such as using pin 24 engaging with hole 3d in a pin fastening means 23, the rocker 3 can be translated freely upwards and downwards in relation to the teeth 25. By releasing the pin 24, the spring-loaded rocker 3 swings into engagement with the teeth 25 and will thereby only allow relative movement of the rocker 3 longitudinally L upwards in relation to the teeth 24, and will specifically allow the rocker to drive the teeth downwards with sufficient force so as to expel the soil cylinder in the cutting cylinder 4.

As is illustrated in the Figures, the teeth 25 may be arranged along a straight line along the longitudinal direction L.

Hence, the soil expulsion piston 9 driving mechanism is arranged to transfer the force provided by the weight propulsion device to drive the rocker 3 in relation to said teeth 25 in said first (downwards) direction. Since the rocker 3 is fixed in the longitudinal direction L to the pole 1, the teeth 25 are therefore forced downwards in relation to the pole 1. The teeth 25 are connected to the soil expulsion piston 9, as is illustrated in the Figures, such as by the teeth 25 being arranged on an inner pole being slidingly arranged inside the pole 1 and being connected to the soil expulsion piston 9 at its lower end. Therefore, the forced movement of the rocker 3 in relation to the teeth 25 effectively pushes the soil expulsion piston 9 downwards in relation to the cutting cylinder 4, resulting in that the soil expulsion piston 9 pushes a contained soil cylinder out from the cutting cylinder 4, via the lower open end of the cutting cylinder 4.

In other words, the set of teeth 25 is connected to the soil expulsion piston 9 driving mechanism so that the soil expulsion piston 9 is pushed towards the open end of the cutting cylinder 4 when the rocker 3 moves in relation to said teeth 25 in said first direction.

For each reciprocal movement of the weight propulsion device, the rocker may 3 push the teeth 25 downwards a longitudinal direction L distance equivalent of one of said teeth 25. An individual tooth size may be adapted so that this is the case given the properties of the weight propulsion device amplitude, the mechanical properties of the lever 2 and the rocker 3. When the weight propulsion device pulls the rocker 3 engagement part 3b upwards, it slides into engagement with the next tooth of the teeth 25, and then drives the teeth 25 downwards an additional tooth distance when the weight propulsion device pushes the rocker 3 engagement part 3b downwards. The teeth may slidingly engage with the pole 1 with sufficient friction so that the rocker 3 engagement part 3b does not pull the teeth 25 with it when being pulled upwards. It is understood that it is also possible to provide smaller teeth 25, so that the rocker 3 slides across more than one tooth as the weight 5 moves upwards.

A longitudinal distance L between each tooth crest between said teeth 25 may be between 5 mm and 20 mm, such as about 10 mm. The soil cylinder may be completely expelled using about 5-20 revolutions by the weight propulsion device, providing a very swift and convenient soil cylinder expulsion.

In a preferred embodiment, the device 30 further comprises a cutting cylinder engagement part 17, arranged to selectively arrange the cutting cylinder 4 within reach or out of reach of being struck by the weight 5 as the weight 5 moves reciprocally between said first and second endpoints. Hence, the engagement part 17 may be arranged to adjust the relative position, in the longitudinal direction, between a striking part of the weight 5 and a part of the cutting cylinder 4 being struck by the weight 5.

Such a cutting cylinder engagement part 17 may be arranged to modify the position of the weight 5 striking part and/or of the cutting cylinder 4 struck part. However, in the preferred embodiment disclosed in the Figures, the cutting cylinder engagement part 17 is operable to modify only the cutting cylinder 4 struck part. This may, in turn, be accomplished by adjusting the longitudinal direction L position of the cutting cylinder 4 as a whole. However, it is preferred that the cutting cylinder 4 as a whole is not moved along the longitudinal direction L in such adjustment, but instead that the cutting cylinder 4 is rotated about the angular direction A in a way so that a different upper part of the cutting cylinder 4 is angularly A aligned with a striking part of the weight 5 due to such adjustment.

Namely, the cutting cylinder 9 engagement part 17 may comprise a ring (see FIGS. 6a and 6b), the ring being rotatable in the angular direction A about the longitudinal direction L. The ring may further comprise at least one upwards-facing pinnacle 17a, such as a series of at least two, preferably at least three, pinnacles 17a. The pinnacles 17a, in turn, being arranged on a top part of the cutting cylinder 4, may be arranged to cooperate with corresponding pinnacles 5a on the weight 5, in particular corresponding downwards-facing pinnacles 5a provided on an underside of the weight 5, so that, when the ring is in a first angular A position (shown in FIG. 6a), the cutting cylinder 4 is within longitudinal direction L reach of being struck by the weight 5 as the weight 5 moves reciprocally between said first and second endpoints, and so that, when the ring is in a second angular A position (shown in FIG. 6b), the cutting cylinder 4 is out of reach of being struck by the weight 5 as the weight 5 moves reciprocally between said first and second endpoints.

In practise, the ring may be turnable to two distinct angular A positions—one in which the cutting cylinder 4 is engaged and one in which it is disengaged. These two distinct angular A positions can be set using a locking means, such as comprising a metal spring-loaded ball 11 which is pressed into a seat in cylinder fastener 18.

It is realized that a corresponding angularly A turning ring can instead be provided on the weight 5 to achieve the corresponding effect.

This way, the ring can be turned so that the cutting cylinder 4 is disengaged from the weight 5 as the soil cylinder is to be expelled, and turned back so that the cutting cylinder 4 is engaged with weight 5 for being struck by weight 5 as a new hole is to be cut in the green 100. This in turn allows the weight 5 to always be reciprocally driven by the weight propulsion device, irrespectively of the mode of operation of the device 30, which provides for a simple and sturdy construction with a minimum of moving parts. Also, the movement of the weight 5 aids in expelling the soil cylinder since the weight is accelerated away from the soil cylinder as the soil cylinder is pushed out in the opposite direction.

In some embodiments, the cutting cylinder engagement part 17 may be arranged to alter a required longitudinal direction L weight 5 amplitude for striking the cutting cylinder 4 by between 5 and 20 mm. When disengaging the cutting cylinder 4 from the weight 5 using the engagement part 17, this distance is hence increased sufficiently to not at all allow the weight 5 to come into contact with the cutting cylinder 4 when moving between the first and second endpoints along the weight path.

In some embodiments, the total longitudinal direction L weight 5 amplitude, in other words the longitudinal direction L distance between the first and second endpoints of the weight 5 along the weight path, may be between 50 and 200 mm, such as between 70 and is 120 mm.

In some embodiments, the total longitudinal direction L weight 5 amplitude may be at least 50 mm, such as at least 70 mm or even at least 80 mm.

In some embodiments, the total longitudinal direction L weight 5 amplitude may be at the most 200 mm, such as at the most 150 mm or even at the most 100 mm.

In order to maximize the striking impact of the weight 5 onto the cutting cylinder 4, it is preferred that the weight 5, when striking the cutting cylinder 4 in the engaged state of the cutting cylinder 4, is located at the most 10 mm from the lower second endpoint of the weight 5 along the weight path.

The ring of the cutting cylinder engagement part 17 is preferably freely rotatable in the angular direction A in relation to the rest of the cutting cylinder 4. As mentioned above, the cutting cylinder 4 may be rigidly connected to the pole 1. This way, when the device 30 is cut down into the soil and the user turns the handle 13 (which is also rigidly connected to the pole 1) in the angular direction A, the cutting cylinder 4 will turn as a result, since the cutting cylinder 4 is rigidly connected, via the pole 1, to the handle 13. Due to the friction of the surrounding soil, the ring of the cutting cylinder engagement part 17 will, however, not move, resulting in that the ring moves in relation to the rest of the cutting cylinder 4. This way, the user may easily disengage the cutting cylinder from the weight 5 by simply twisting the handle 13 once the hole is cut. The soil cylinder can then be lifted up and expelled at a desired location.

It is preferred that said pinnacles 17a are equiangularly disposed about a circumference of the cutting cylinder's 4 upper side, and correspondingly for pinnacles 5a about a circumference of the weight's 5 lower side. In a preferred case, there are between 4 and 8 each of such pinnacles 17a, 5a, making it possible to disengage the cutting cylinder 4 by turning the ring of the engagement part 17 between 22.5° and 45° when the device 30 is cut down into the soil.

Similarly, after the soil cylinder has been expelled into an existing hole in the green 100, the user can use the soil friction in that existing hole to turn the handle 13 back to the engaged state of the cutting cylinder 4, preparing for cutting a new hole.

To this end, the ring preferably has a cylindrical outer surface (its lateral surface) with a shape corresponding to an outer cylindrical shape of the cutting cylinder 4 (its lateral surface), having a diameter and external cross-sectional shape which is substantially identical to that of the outer side of the cutting cylinder 4.

In the concrete example shown in the Figures, during expulsion the piston rod side 7b of the hydraulic cylinder is pressurized, resulting in that an F-pole 10, via surface 10a, presses against a ball-bearing suspended roll 15. As a result, lever 2 is pressed upwards and pivots, in turn pressing the rocker 3 pivotally downwards, so that its engagement end 3b forces, via a force applied against teeth 25 and in particular rounded teeth 25 bottoms 8b, a rod 8 that in turn urges piston 9 downwards, finally forcing the soil cylinder out from the cutting cylinder 4.

A round radially direction R inner part 3c of the rocker 3 may guide the rod 8 via longitudinal direction L track 8a, counteracting twisting of the rod 8.

It is noted that when the pin 24 is engaged, forcing the rocker 3 to stay in a swung-out, disengaged state against the spring-loading force, the rod 8 may move freely upwards and downwards in relation to the pole 1. As a result, when cutting into the soil to produce a new hole, the soil expulsion piston 9 is pressed upwards in relation to the pole by the soil surface, as the cutting cylinder 4 is cut down into the soil.

The rod 8 may be freely movable, in the longitudinal direction L, in relation to the cutting cylinder 4.

FIG. 6a shows the rocker 3 pivoted out about 20° and locked in this disengaged state via pin 24, in a state where the rocker 3 is hence spring-loaded against the locking force provided by pin 24. FIG. 6b shows the rocker 3 in an engaged state, with pin 24 not engaged with rocker 3 and the spring-loading of the rocker 3 urging it to pivot back into engagement with the teeth 25.

The weight 5 may weigh at least 0.5 kg, such as at least 1 kg, 2 kg, such as at least 3 kg.

The weight 5 may weigh at the most 10 kg, such as at the most 7 kg. In preferred embodiments, the weight weighs about 4-5 kg.

For very light weights 5, such as between 0.5 kg and 1 kg, it is preferred to use relatively high hydraulic pressures. For instance, a 0.5 kg weight 5 would require at least 100 bars hydraulic pressure, and as the weight 5 increases the required hydraulic pressure would decrease proportionally.

Each of the cylinders 7 may be provided with a dampening function, such as a hydraulically acting dampening, at either or both of the longitudinal endpoints of the pistons 16.

As mentioned above, the weight propulsion device may comprise at least one, preferably at least or exactly two, pistons 16, arranged to move reciprocally in the longitudinal direction L to reciprocally drive the weight 5 upwards and downwards.

In particular, the at least one piston 16 may be hydraulic pistons, operating at a hydraulic pressure of at least 100 bars. This hydraulic pressure may be achieved and provided by a hydraulic pump 19d (see FIG. 7), being a part of the device 30. The hydraulic pump 19d may in turn be driven by an electric motor 19c. The at least one piston 16 is or are then provided with pressurized hydraulic fluid, such as water or oil, by said hydraulic pump 19d.

The device 30 may further comprise a battery, arranged to power the motor 19c. This way, all of the components comprised in the device 30 may be packaged into one cordless, mobile unit for ease of use when out and about on the golf course, while still being able to provide sufficient power to quickly cut holes as described herein. Such mobile unit is preferably arranged with a weather-proof chassis arranged to enclose all weather-sensitive components of the device 30.

In FIG. 7, 19e denotes a pressure guard, controlling the operation (such as on/off operation) of the motor 19c. 19h denotes a manually settable flow valve, via which the user can control the instantaneous power of the device across a continuous or step-wise scale, such as between 0% to 100% of full capacity hydraulic fluid flow. 19i denotes a hydraulic fluid tank. 19j denotes a pressure-controlled automatic switch valve, for controlling the reciprocal movement of the pistons 16 in the cylinders 7 by providing a reciprocally switching pressure to chambers 7a and 7b.

19f denotes a gas accumulator, in turn comprising a valve and being arranged to pressurize a gas (such as air or an inert gas, for instance nitrogen) to at least 50 bars, such as to between 50 and 100 bars, and to pressurize said hydraulic fluid when said valve is set in an open state.

Such a gas accumulator, which is comprised as a part of the device 30, may be in the form of a steel container with an inner rubber membrane separating said pressurized gas from the hydraulic fluid. It may comprise two separate and controllable connections—one for supply of pressurized gas and one for connection to the hydraulic fluid for pressurizing the s latter.

For instance, the gas accumulator container may have a total volume of 1 litre, which volume is filled with pressurized nitrogen gas until a final pressure of 50 bars. The rubber membrane is then pressed out, by the gas, against the inner steel wall of the container. Oil is pumped in via said connection, until a total oil volume in said container, separated from the nitrogen gas by said rubber membrane, of 0.5 l has been obtained. This pumping is achieved by pump 19d driven by motor 19c. As a result of the entering oil, the nitrogen gas volume decreases to half of its original size, why the nitrogen gas pressure is doubled to 100 bars. Such pumping of the oil into the container may take about 1 minute to is complete.

Then, by opening valve 19h, a very large and rapid flow of pressurized hydraulic fluid can be achieved, even if using a pump 19d of limited flow capacity to build up said pressure over a longer time frame such as one minute. Hence, using such a gas accumulator, a relatively small hydraulic pump 19d may be used while still allowing sufficient power to be available to cut a sufficiently deep hole sufficiently quickly. The accumulator may be recharged while the device 100 is taken to the site of the next hole cutting, powered by the same battery that powers the hydraulic pump 19d.

FIG. 8 illustrates the golf green 100 with an existing hole 101 to be replaced with ("moved to") a hole 102 to be cut.

FIG. 9 illustrates a method according to the present invention, for making a hole in a golf green 100, and also for performing such a "moving" of the hole 101 to a new hole 102 location on the green 100.

In a first step, the method starts.

In a subsequent step, a device 30 of the above type is provided. This step may also comprise charging the battery of such a device before use.

In a subsequent step, the device 30 is positioned in a first location 102 on the golf green 100, oriented so that its longitudinal direction L is vertical or at least substantially vertical. The first location 102 is the location where a hole is to be cut, or the location to which an existing hole is to be moved.

In a subsequent step, the weight propulsion device of the device 30 is activated, such as using a push button or similar on the device 30, to move the weight 5 reciprocally upwards and downwards as described above, and as a result repeatedly striking the cutting cylinder 4 by the weight 5 so that the cutting cylinder 4 by each stroke is driven down into the soil of the green 100. This step may be preceded by the user disengaging the rocker 3 by pivoting the rocker 3 out from the teeth 25 and inserting pin 24, and may also be preceded by the user engaging the cutting cylinder by activating the cutting cylinder engagement part 17.

In a subsequent step, when a desired hole depth is reached, the cutting cylinder 4 is lifted upwards, by lifting the entire device 30, thereby removing a resulting soil cylinder from the cut hole. This step may be preceded by the user switching off the weight propulsion device, and may further be preceded by the user turning the handle so as to disengage the cutting cylinder 4 against the soil friction as described above.

If the user desires to move a hole in the golf green 100 from said second place 101 to a first place 102, the method may further comprise a subsequent step, in which the device 30 is moved to the second place 101, where a hole already exists in the ground, and positioning the device 30 so that the cut soil cylinder is immediately above and aligned with the existing hole. In connection to this, the expulsion activating mechanism may also be activated so as to switch on the expulsion piston 9 driving mechanism as described above. This may hence include engaging the rocker 3 and disengaging the cutting cylinder 4 as described above (if this has not been done when the device 30 was still in the cut hole, described above).

In a subsequent step, the weight propulsion device is activated, such as by using said push button, so that the soil expulsion piston 9 pushes the soil cylinder our from the cutting cylinder 4 and into the existing hole. Therein, the soil cylinder fills the existing hole and provides a grass turf surface.

Then, the method ends. However, the hole cutting and/or moving may be repeated on the same or a different green, indefinitely, as long as the battery keeps its charging.

Above, preferred embodiments have been described. However, it is apparent to the skilled person that many modifications can be made to the disclosed embodiments is without departing from the basic idea of the invention.

For instance, the numerous alternatives described above are freely combinable as long as they are compatible.

Also, all which has been said herein in relation to the present device is applicable to the present method, and vice versa.

Hence, the invention is not limited to the described embodiments, but can be varied within the scope of the enclosed claims.

The invention claimed is:

1. A device (30) for making a hole in a golf green (100), the device (30) having a longitudinal direction (L), a radial direction (R) and an angular direction (A), the device (30) comprising:
  - a cutting cylinder (4) with an axis parallel to the longitudinal direction (L) and an open end being freely movable along the longitudinal direction (L);
  - a structure, comprising guide means (1) defining a weight path having a first endpoint and a second endpoint;
  - a weight (5), in engagement with said guide means (1) to be guidedly movable along said weight path;
  - a hydraulically driven weight propulsion device, arranged to propel the weight (5) reciprocally along said weight path between said first endpoint and said second endpoint so that the weight (5) strikes against the cutting cylinder (4) when the weight (5) is at a location along said weight path, in turn urging the cutting cylinder (4) in the longitudinal direction (L);
  - a soil expulsion piston (9), movable inside said cutting cylinder (4) along said longitudinal axis;
  - a piston driving mechanism, arranged to transfer a hydraulic force, provided by said weight propulsion device, to the soil expulsion piston (9) to drive the soil expulsion piston (9) in a direction towards said open end of the cutting cylinder (4); and
  - an expulsion activating mechanism, activatable to switch between a first mode of operation of the device (30) and a second mode of operation of the device (30), the device (30) in the first mode of operation being operable for driving the cutting cylinder (4) down into the soil by the weight (5) repeatedly striking onto the cutting cylinder (4), the device (30) in the second mode of operation being operable for expelling a cut soil cylinder out from the cutting cylinder (9) by allowing the same driving mechanism that drives the weight (5) to push the soil expulsion piston (9) to expel the soil cylinder, the switching being effected by the expulsion activating mechanism engaging and disengaging, respectively, the piston driving mechanism in relation to the weight propulsion device.

2. The device (30) of claim 1, wherein the piston driving mechanism comprises a set of teeth (25) and a rocker (3) arranged to cooperate with said set of teeth (25), wherein the rocker (3) comprises an engagement part (3b) and is spring-loaded into engagement with said teeth (25), wherein the teeth (25) are inclined in relation to said engagement part (3b) of the rocker (3) so that the engagement part engages drivingly with the teeth (25) when the rocker (3) moves in relation to the teeth (25) in a first direction and does not engage drivingly with the teeth (25) when the rocker (3) moves in relation to the teeth (25) in a second, opposite direction, wherein the piston driving mechanism is arranged to transfer said force to drive the rocker (3) in relation to said teeth (25) in said first direction, and wherein the set of teeth (25) is connected to the piston driving mechanism so that the soil expulsion piston (9) is pushed towards the open end of the cutting cylinder (4) when the rocker (3) moves in relation to said teeth (25) in said first direction.

3. The device (30) of claim 1, wherein the device (30) further comprises a cutting cylinder engagement part (17), arranged to selectively arrange the cutting cylinder (4) within reach or out of reach of being struck by the weight (5) as the weight (5) moves reciprocally between said first and second endpoints.

4. The device (30) of claim 3, wherein the cutting cylinder engagement part (17) comprises a ring, rotatable in the angular direction (A), comprising a series of pinnacles (17a), the pinnacles (17a) being arranged to cooperate with corresponding pinnacles (5a) on the weight (5) so that, when the ring is in a first angular (A) position, the cutting cylinder (4) is within reach of being struck by the weight (5) as the weight (5) moves reciprocally between said first and second endpoints, and so that, when the ring is in a second angular (A) position, the cutting cylinder (4) is out of reach of being struck by the weight (5) as the weight (5) moves reciprocally between said first and second endpoints.

5. The device (30) of claim 3, wherein the cutting cylinder engagement part (17) is arranged to alter a required longitudinal direction (L) weight (5) amplitude for striking the cutting cylinder (4) with between 5 and 20 mm.

6. The device of claim 1, wherein a total longitudinal direction (L) weight (5) amplitude is between 50 and 200 mm and/or wherein a total longitudinal direction (L) weight (5) amplitude is at the most 150 mm.

7. The device of claim 1, wherein the weight propulsion device comprises at least one piston (16) arranged to move reciprocally in the longitudinal direction (L).

8. The device of claim 7, wherein the at least one piston (16) is or are hydraulic pistons, operating at a hydraulic pressure of at least 100 bars.

9. The device of claim 8, wherein the device (30) furthermore comprises a hydraulic pump (19d) driven by an electric motor (19c), and wherein the at least one piston is or are provided with pressurized hydraulic fluid by said hydraulic pump (19d).

10. The device of claim 9, wherein the device (30) further comprises a battery, arranged to power said motor (19c).

11. The device of claim 9, wherein the device (30) further comprises a gas accumulator (19f) in turn comprising a valve and being arranged to pressurize a gas to at least 50 bars and to pressurize said hydraulic fluid when said valve is set in an open state.

12. A method for making a hole in a golf green (100), comprising:
  a. providing a device (30) according to claim 1;
  b. positioning said device (30) in a first location on the golf green (100) oriented so that its longitudinal direction (L) is vertical;
  c. activating the hydraulically driven weight propulsion device to move the weight (5) reciprocally and as a result repeatedly striking the cutting cylinder (4) so that the cutting cylinder (4) by each stroke is driven down into the ground; and
  d. when a desired hole depth is reached, lifting the cutting cylinder (4) upwards, thereby removing a resulting soil cylinder from the hole.

13. A method for moving a hole in a golf green (100) from a second place to a first place, comprising the steps according to claim 12 and further comprising:
- e. activating the expulsion activating mechanism so as to switch on the piston driving mechanism;
- f. positioning the device (30) at the second location, at which a hole already exists in the ground; and
- g. activating the weight propulsion device so that the soil expulsion piston (9) pushes the soil cylinder out from the cutting cylinder (4) and into the existing hole.

* * * * *